US012439170B2

(12) United States Patent
Endo et al.

(10) Patent No.: US 12,439,170 B2
(45) Date of Patent: Oct. 7, 2025

(54) OBJECT RECOGNITION SYSTEM AND METHOD OF SIGNAL PROCESSING PERFORMED BY OBJECT RECOGNITION SYSTEM, AND ELECTRONIC APPARATUS

(71) Applicant: SONY GROUP CORPORATION, Tokyo (JP)

(72) Inventors: Kenta Endo, Tokyo (JP); Ayaka Hirata, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 288 days.

(21) Appl. No.: 17/755,207

(22) PCT Filed: Aug. 4, 2020

(86) PCT No.: PCT/JP2020/029799
§ 371 (c)(1),
(2) Date: Apr. 22, 2022

(87) PCT Pub. No.: WO2021/084832
PCT Pub. Date: May 6, 2021

(65) Prior Publication Data
US 2022/0400213 A1  Dec. 15, 2022

(30) Foreign Application Priority Data
Oct. 30, 2019 (JP) .................. 2019-197052

(51) Int. Cl.
*H04N 23/56* (2023.01)
*G06V 40/16* (2022.01)
(Continued)

(52) U.S. Cl.
CPC ........... *H04N 23/76* (2023.01); *G06V 40/161* (2022.01); *G06V 40/168* (2022.01); *H04N 23/56* (2023.01);
(Continued)

(58) Field of Classification Search
CPC ........ H04N 23/76; H04N 23/56; H04N 23/71; H04N 23/74; H04N 23/60; H04N 23/65;
(Continued)

(56) References Cited

U.S. PATENT DOCUMENTS

2016/0309133 A1* 10/2016 Laroia .................. H04N 13/271
2019/0045173 A1*  2/2019 Hicks .................. G01B 11/2545
(Continued)

FOREIGN PATENT DOCUMENTS

DE    102018129009 A1    6/2019
JP      2019-083501 A     5/2019
(Continued)

OTHER PUBLICATIONS

Christian Brandli et al: "Adaptive pulsed laser line extraction for terrain reconstruction using a dynamic vision sensor", Frontiers in Neuroscience, vol. 7, Jan. 17, 2014 (Jan. 17, 2014), pp. 1-9, XP055142635, DOI: 10.3389/fnins.2013.00275 * the whole document*.

(Continued)

*Primary Examiner* — Jonathan M Hansen
(74) *Attorney, Agent, or Firm* — CHIP LAW GROUP

(57) ABSTRACT

An object recognition system of the disclosure includes a light source emitting dot light having a predetermined pattern to an object, an event detection sensor receiving the dot light having the predetermined pattern reflected by the object and detecting the fact that a change in luminance of a pixel has exceeded a predetermined threshold as an event, and a signal processor removing information other than event information originated from the dot light emitted from the light source and having the predetermined pattern among event information detected by the event detection sensor.

13 Claims, 17 Drawing Sheets

(51) Int. Cl.
  *H04N 23/71* (2023.01)
  *H04N 23/74* (2023.01)
  *H04N 23/76* (2023.01)
  *H04N 25/672* (2023.01)
(52) U.S. Cl.
  CPC ............. *H04N 23/71* (2023.01); *H04N 23/74* (2023.01); *H04N 25/672* (2023.01)
(58) Field of Classification Search
  CPC .... H04N 25/60; G06V 40/161; G06V 40/168; G01B 11/2513
  See application file for complete search history.

(56) References Cited

U.S. PATENT DOCUMENTS

2020/0082157 A1* 3/2020 Susskind .............. G06V 40/169
2020/0099921 A1* 3/2020 Hicks ................... H04N 13/271
2020/0264311 A1* 8/2020 Le Dortz ................ G01S 17/36

FOREIGN PATENT DOCUMENTS

| TW | 201937917 A | 9/2019 |
| WO | 2019/082686 A1 | 5/2019 |
| WO | 2019/135411 A1 | 7/2019 |
| WO | WO-2021039022 A1 | 3/2021 |

OTHER PUBLICATIONS

Leroux T et al: "Event-Based Structured Light for Depth Reconstruction using Frequency Tagged Light Patterns", arxiv.org, Cornell University Library, 201 Olin Library Cornell University Ithaca, NY 14853, Nov. 27, 2018 (Nov. 27, 2018), XP080939284,* the whole document*.

International Search Report and Written Opinion of PCT Application No. PCT/JP2020/029799, issued on Nov. 2, 2020, 09 pages of ISRWO.

* cited by examiner

[FIG. 1A]
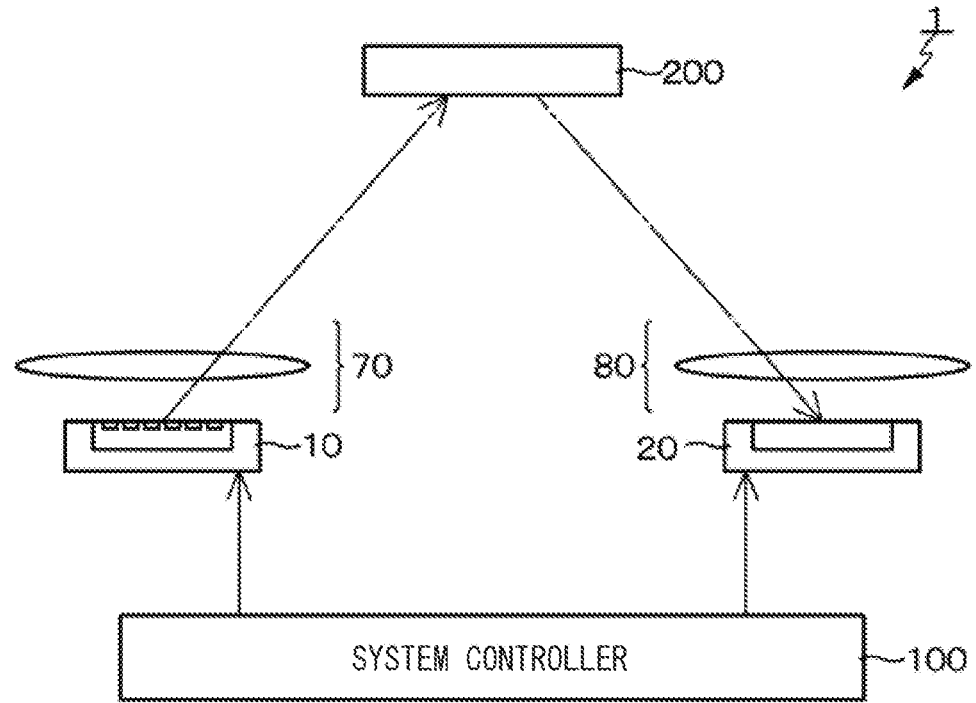
[FIG. 1B]
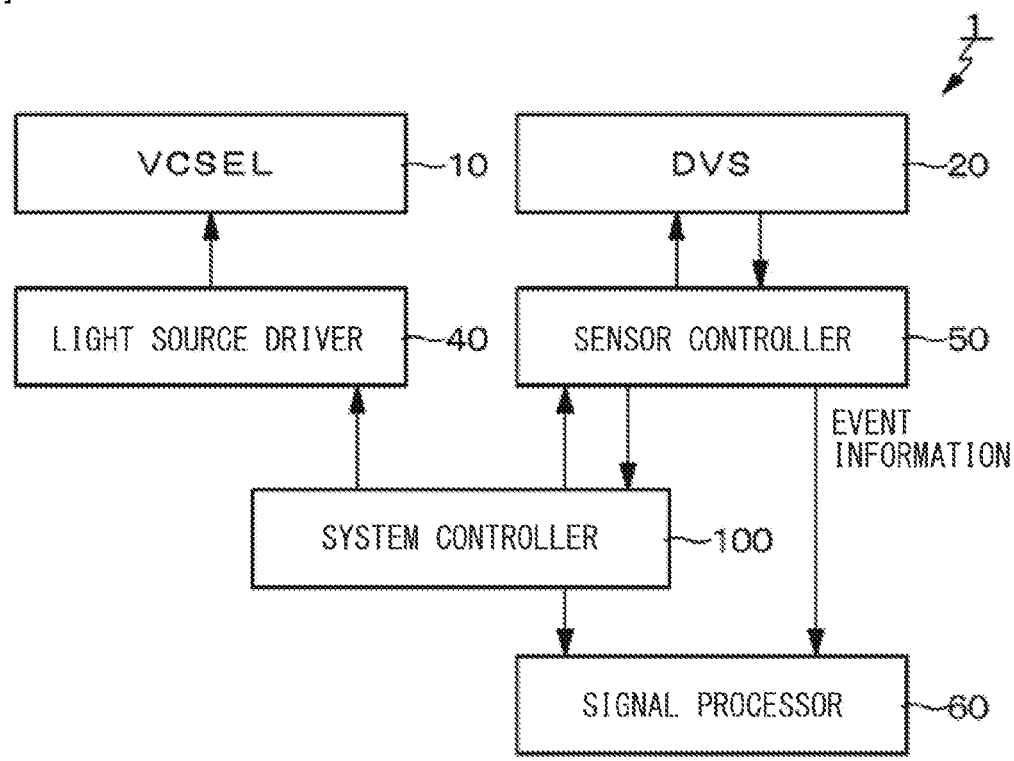

[FIG. 2A]
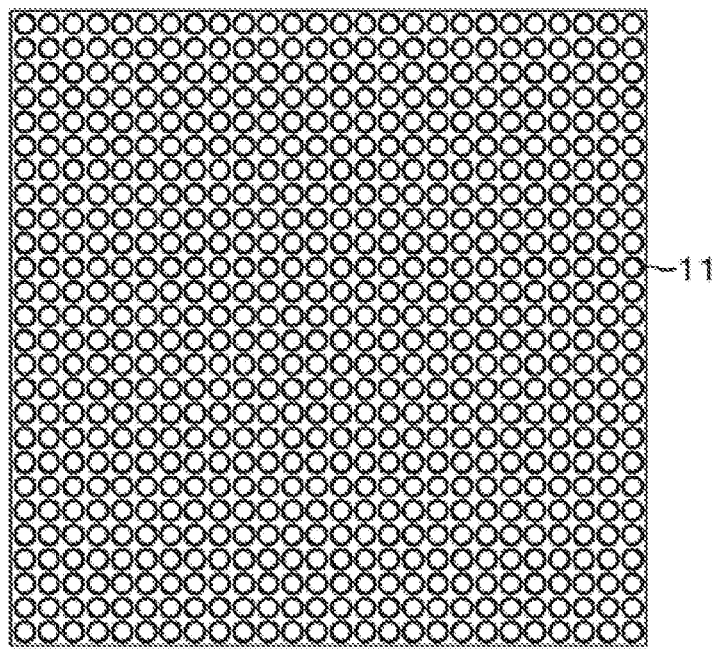
[FIG. 2B]
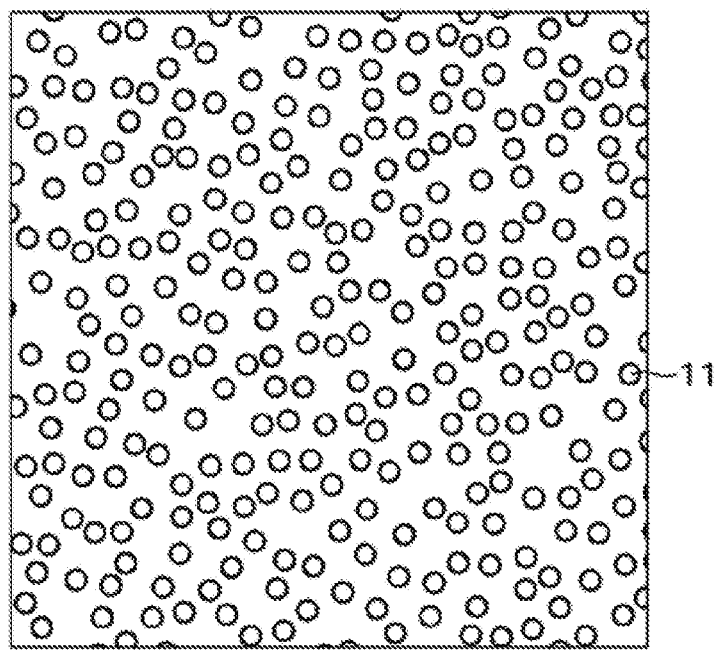

[FIG. 3]
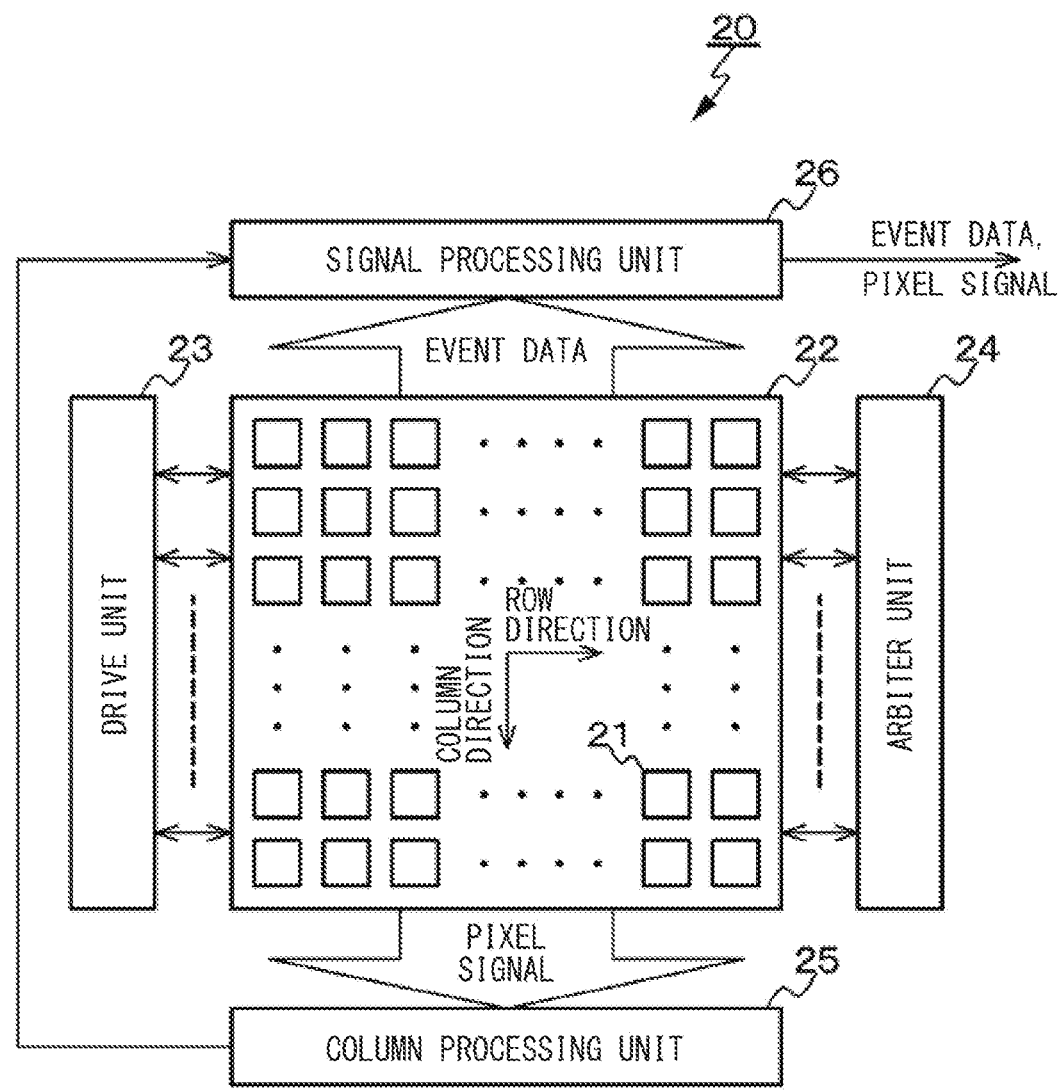

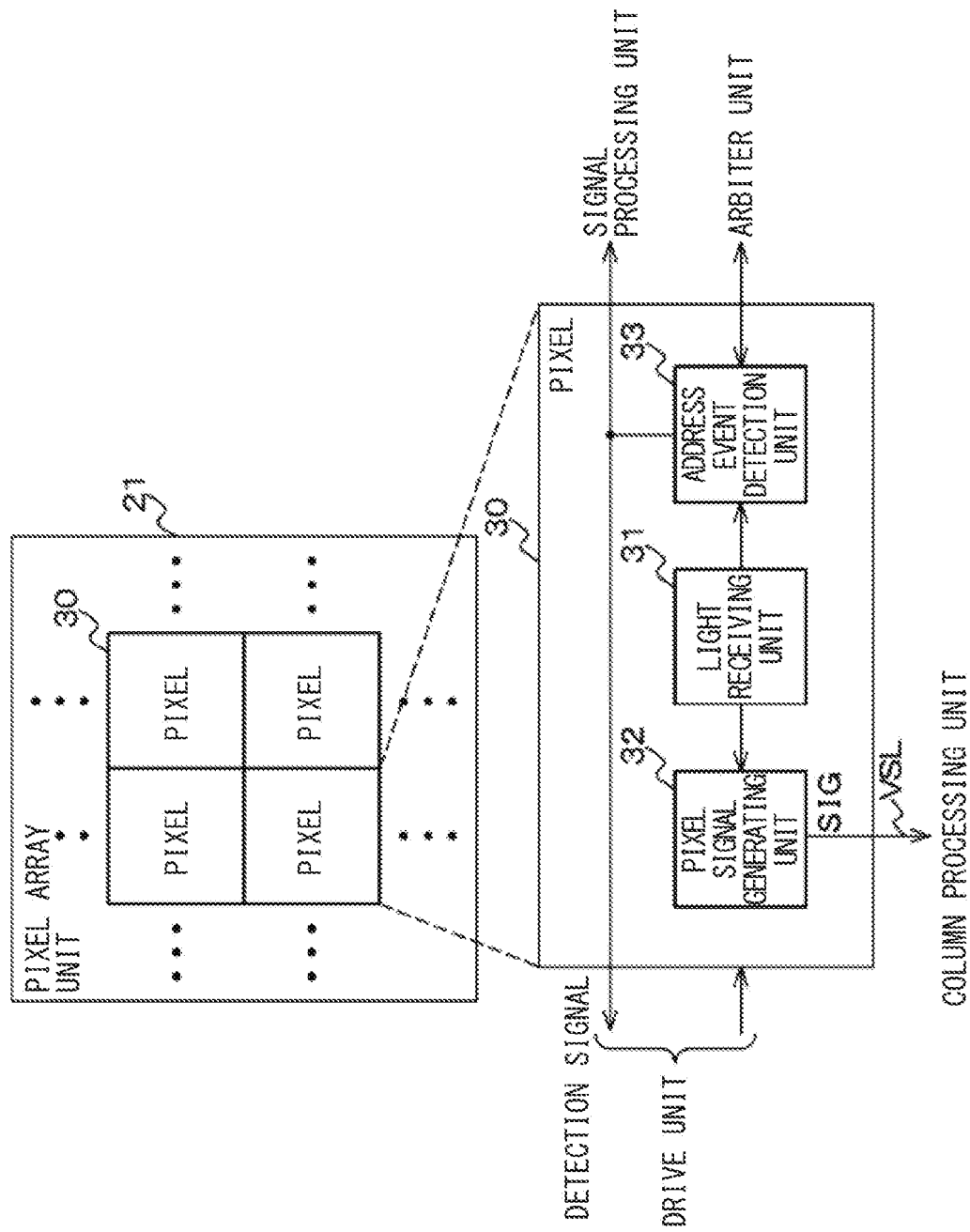
[FIG. 4]

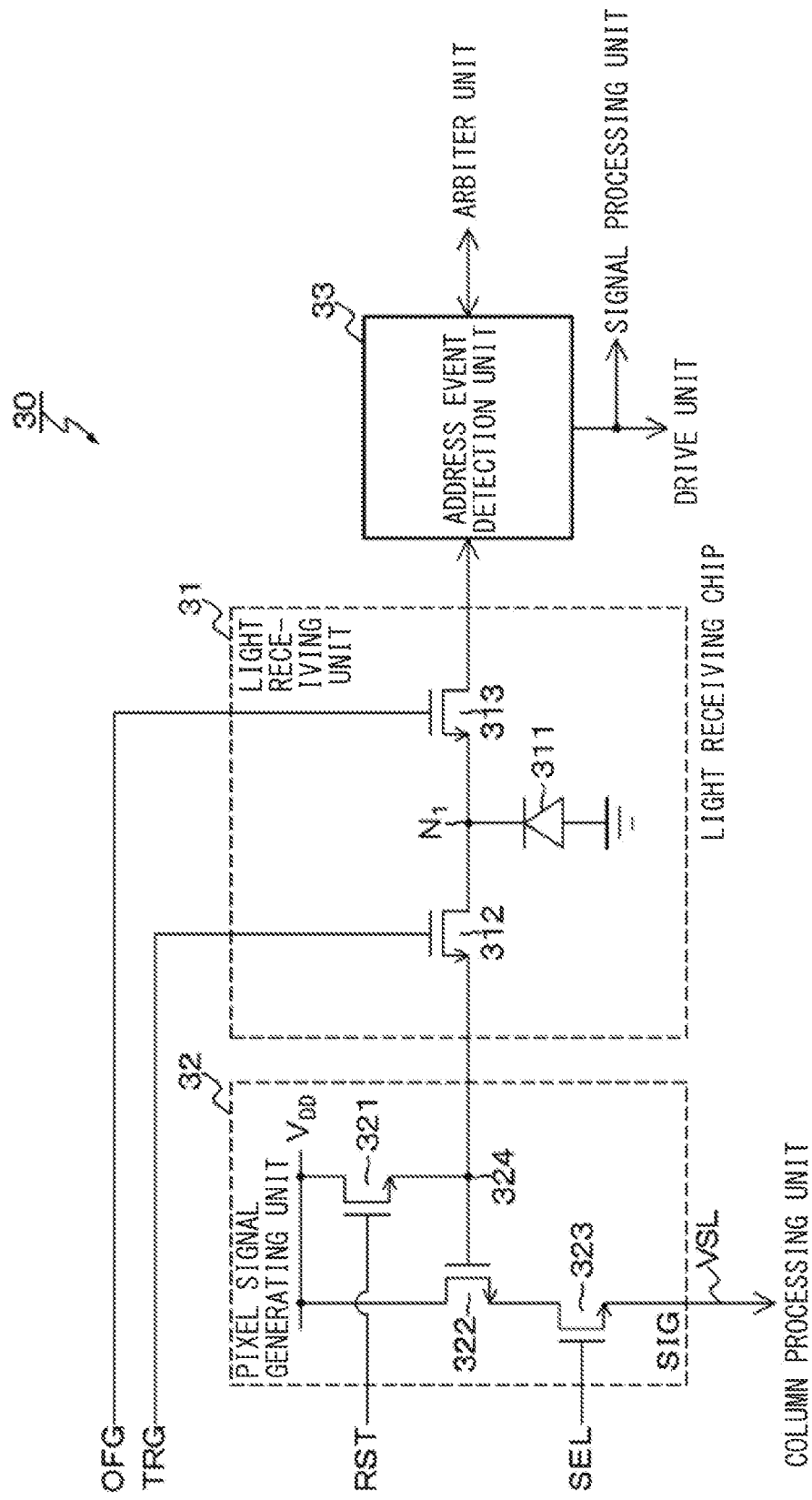

[FIG. 6]
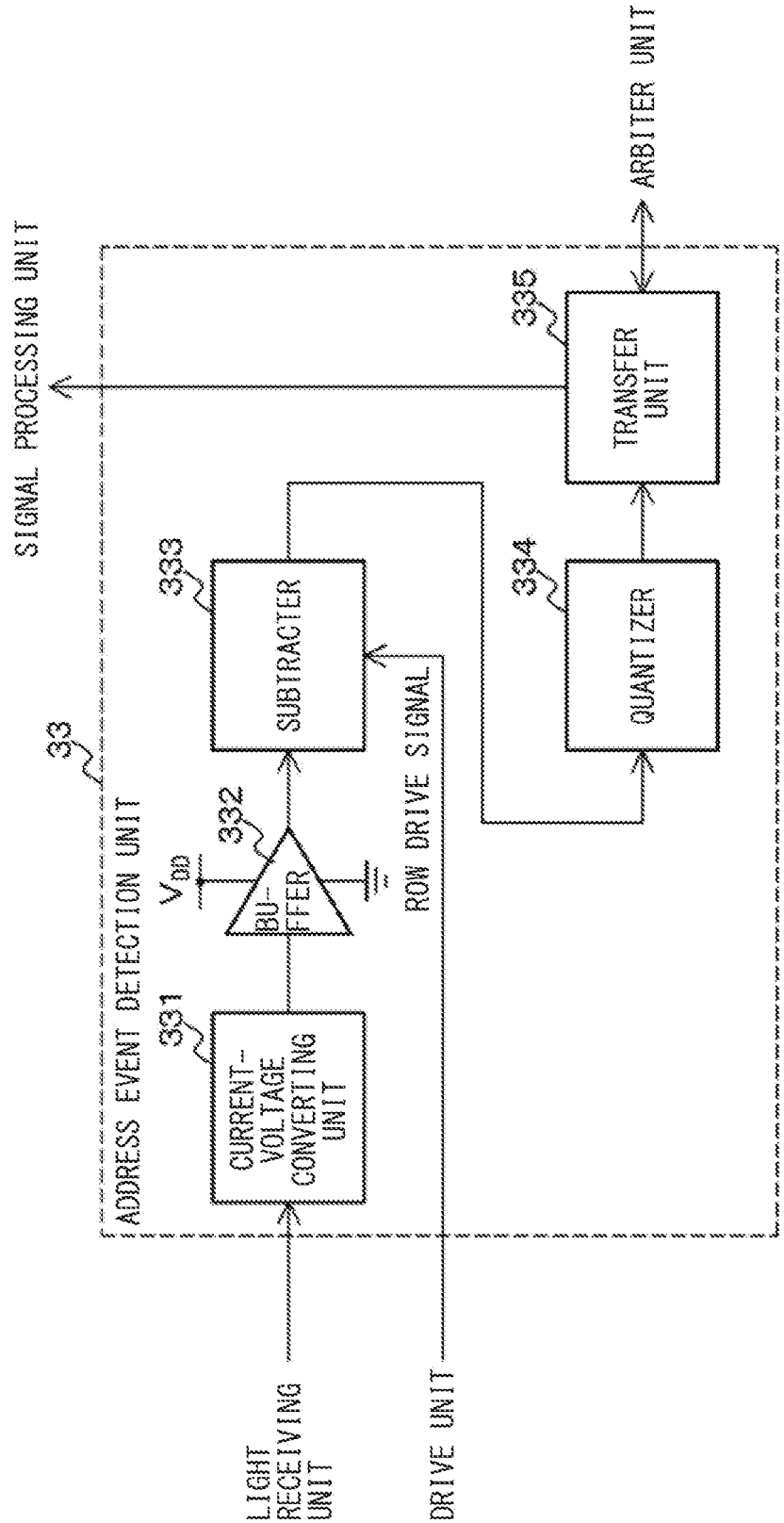

[FIG. 7]
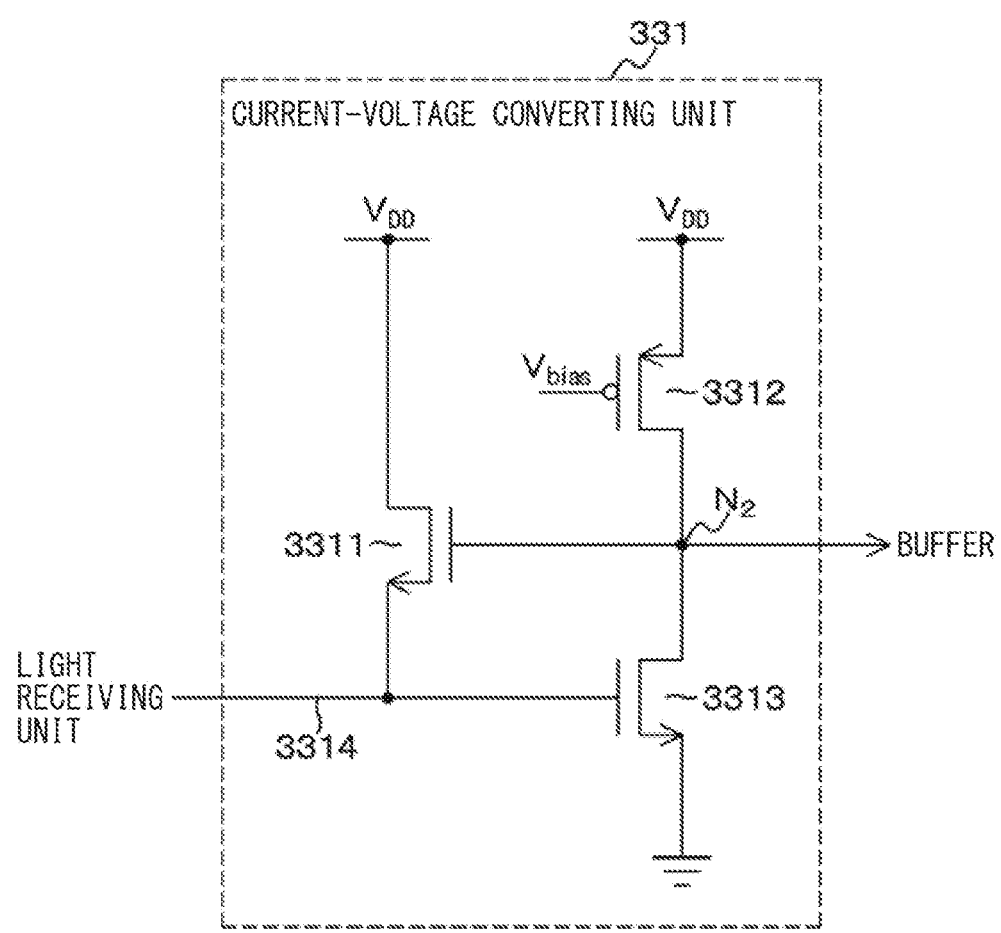

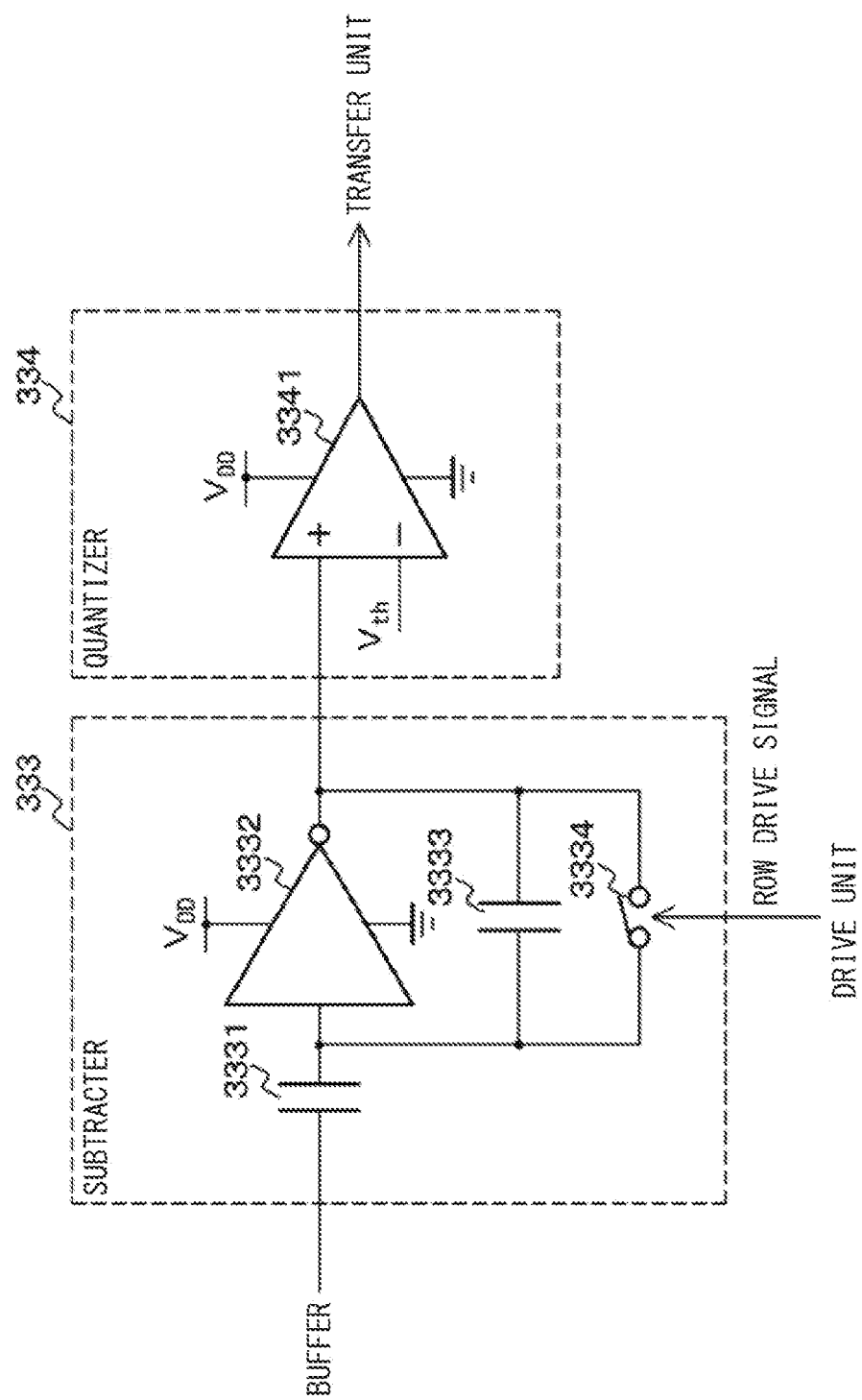

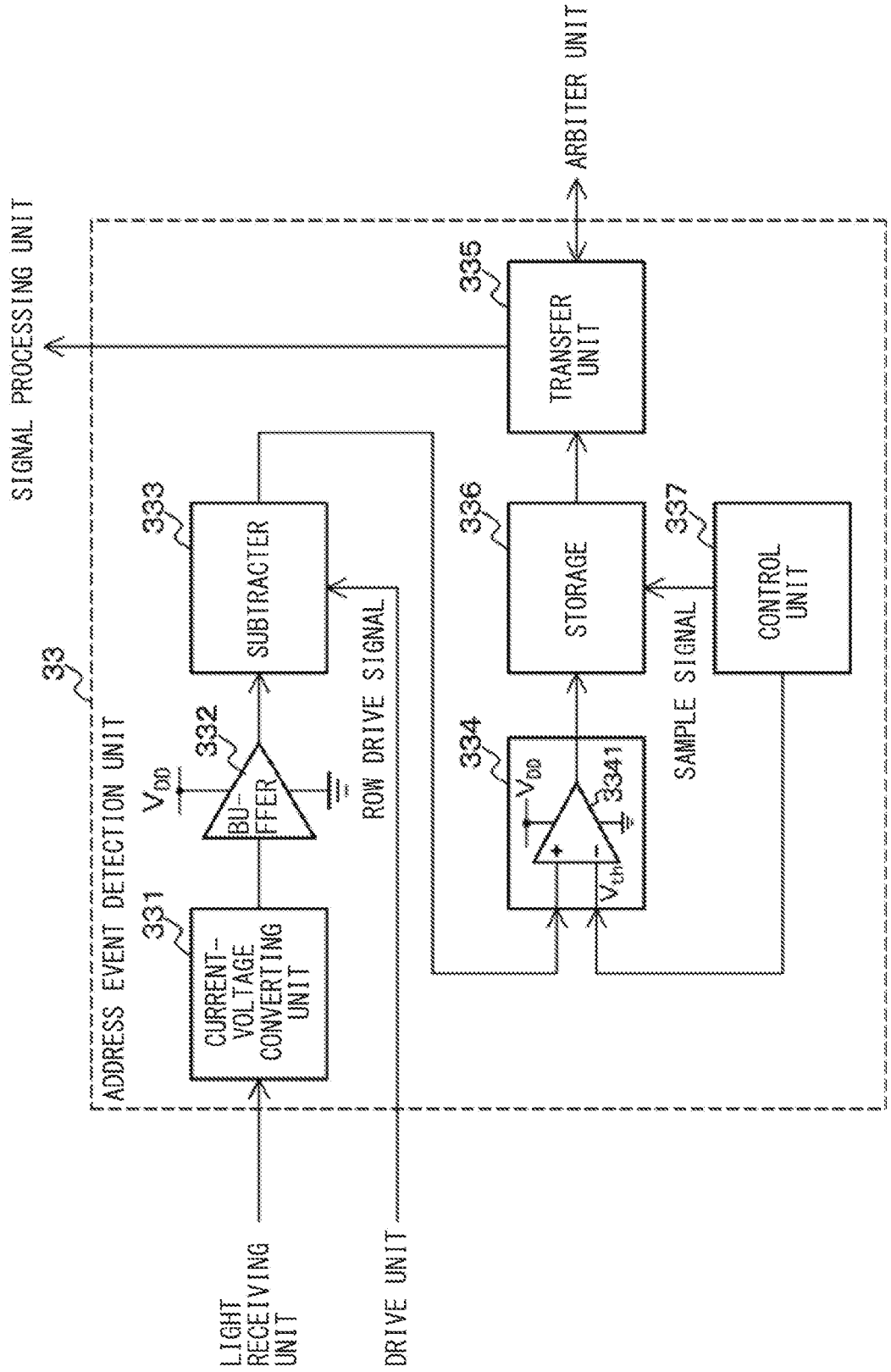
[FIG. 9]

[FIG. 10]
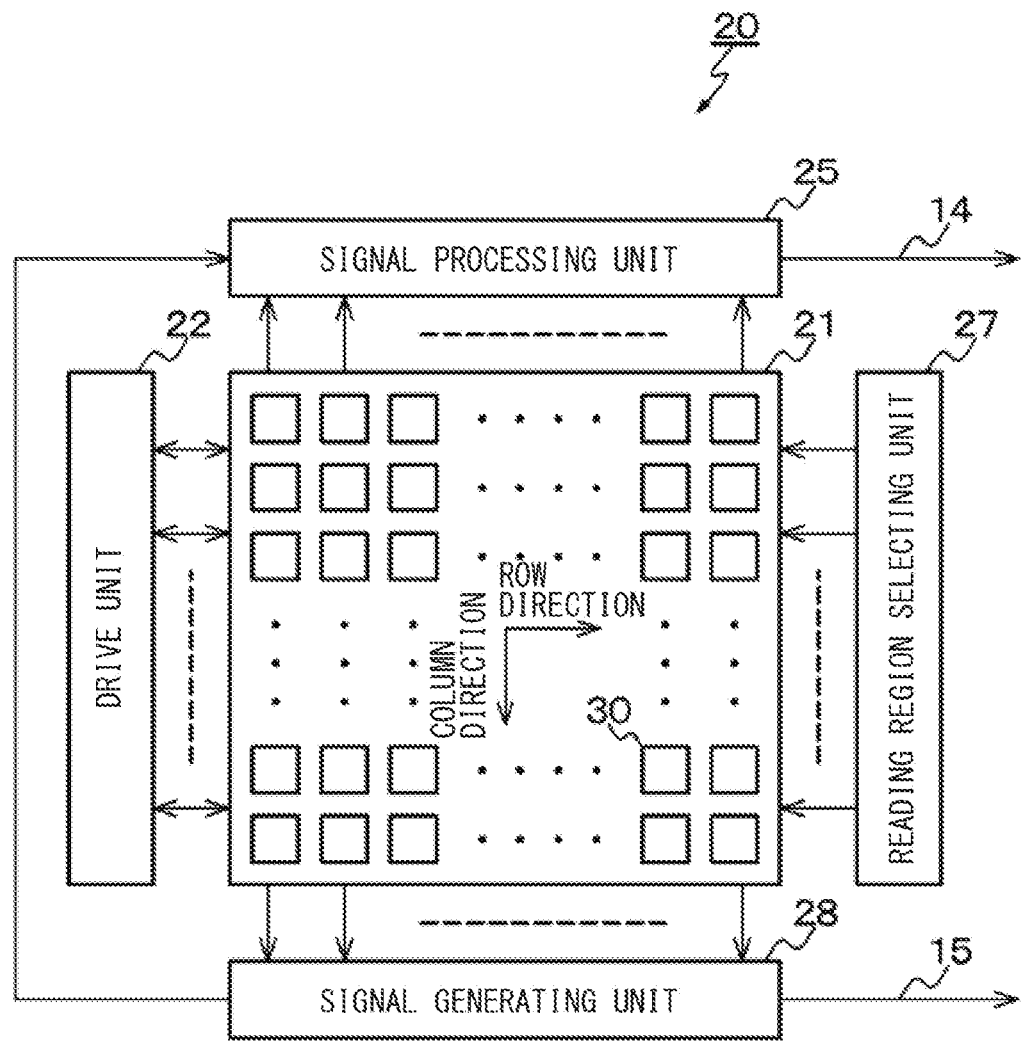

[FIG. 11]
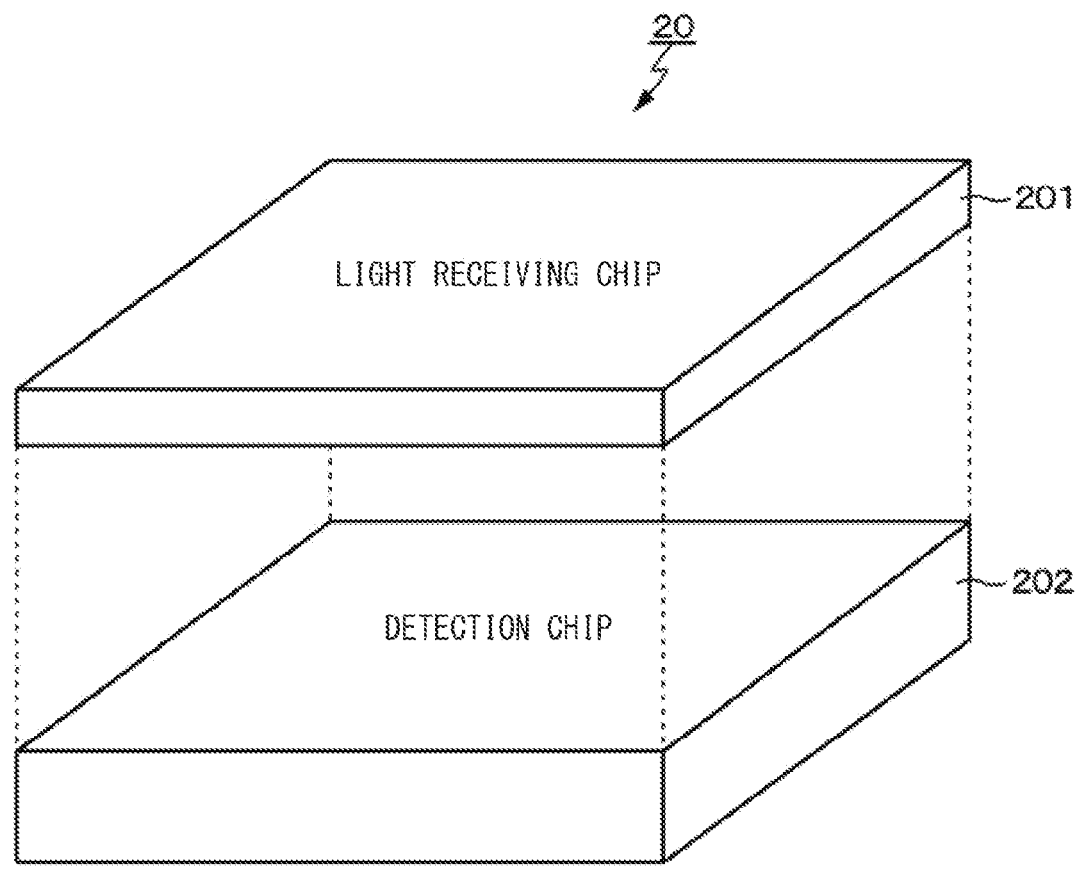

[FIG. 12A]
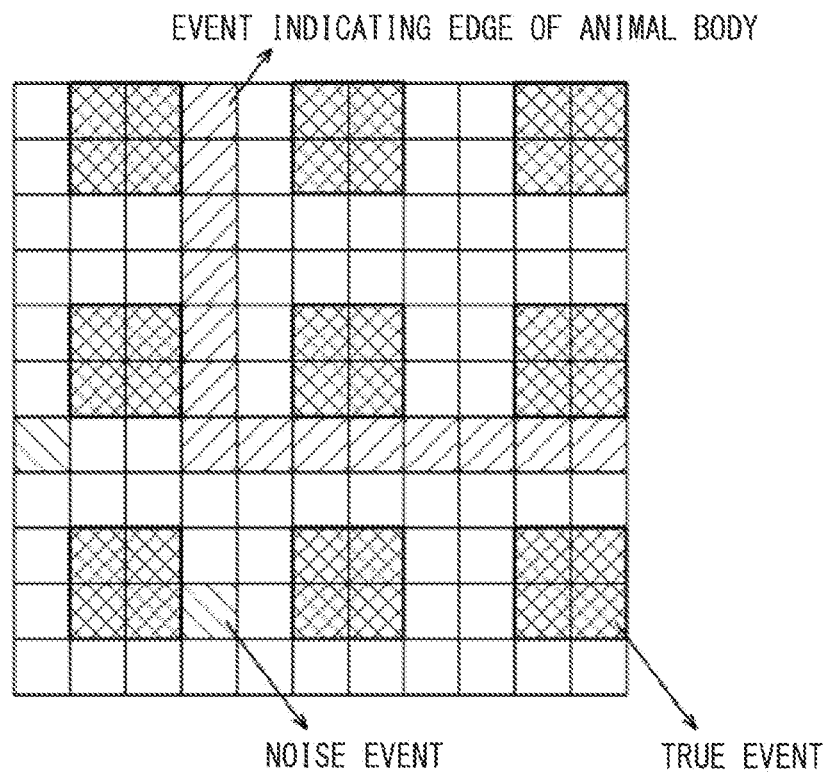
[FIG. 12B]
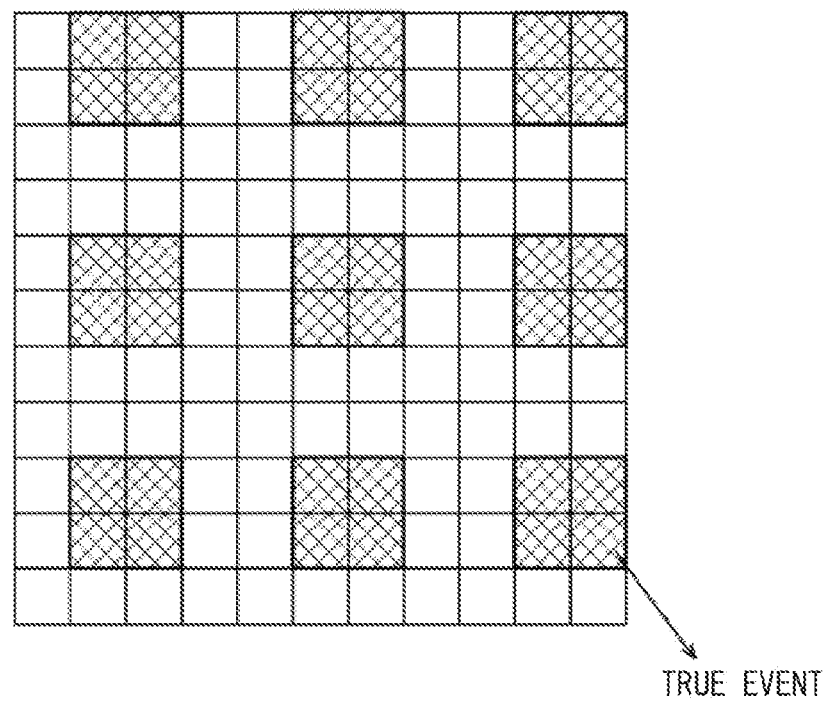

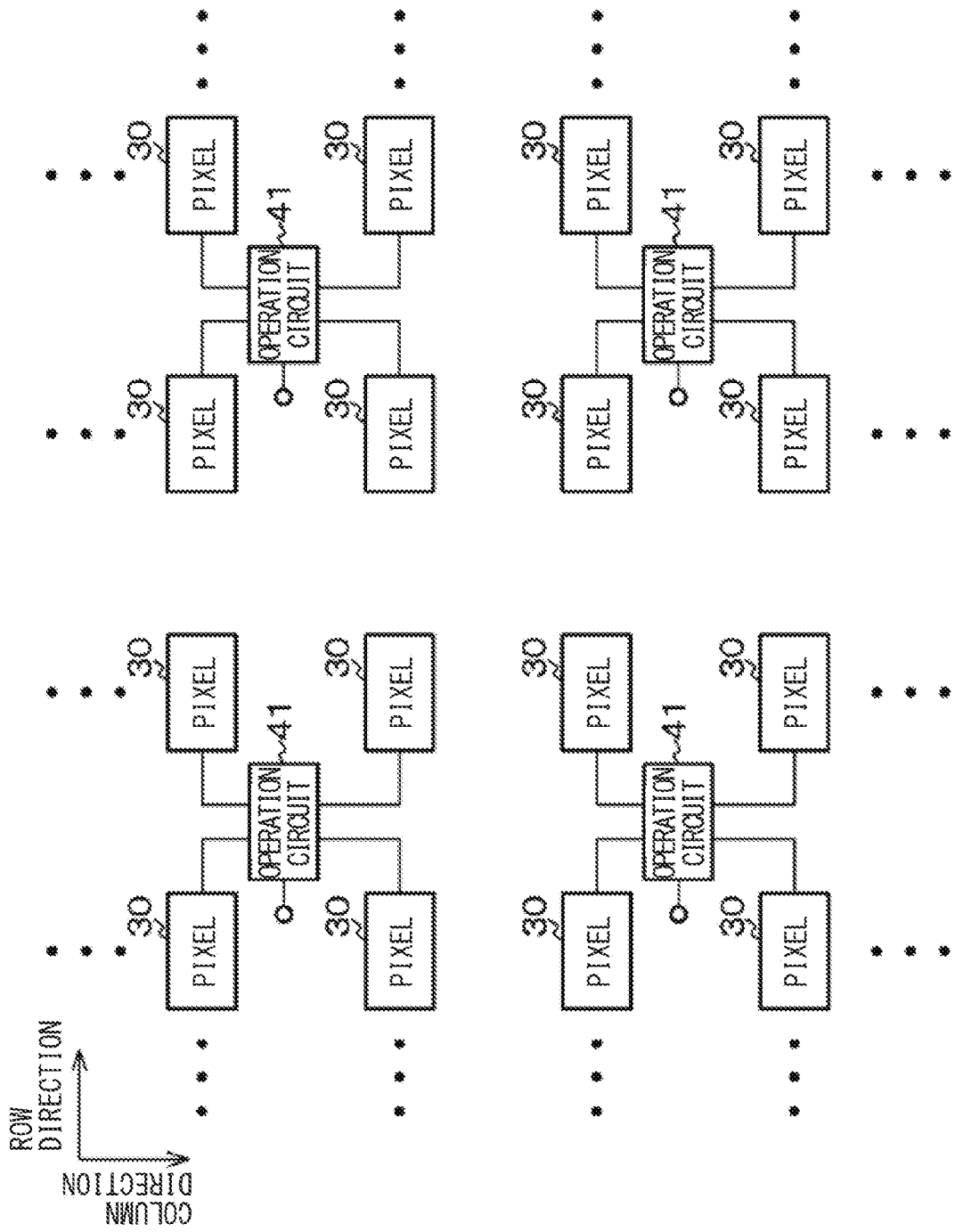
[FIG. 13]

[FIG. 14A]
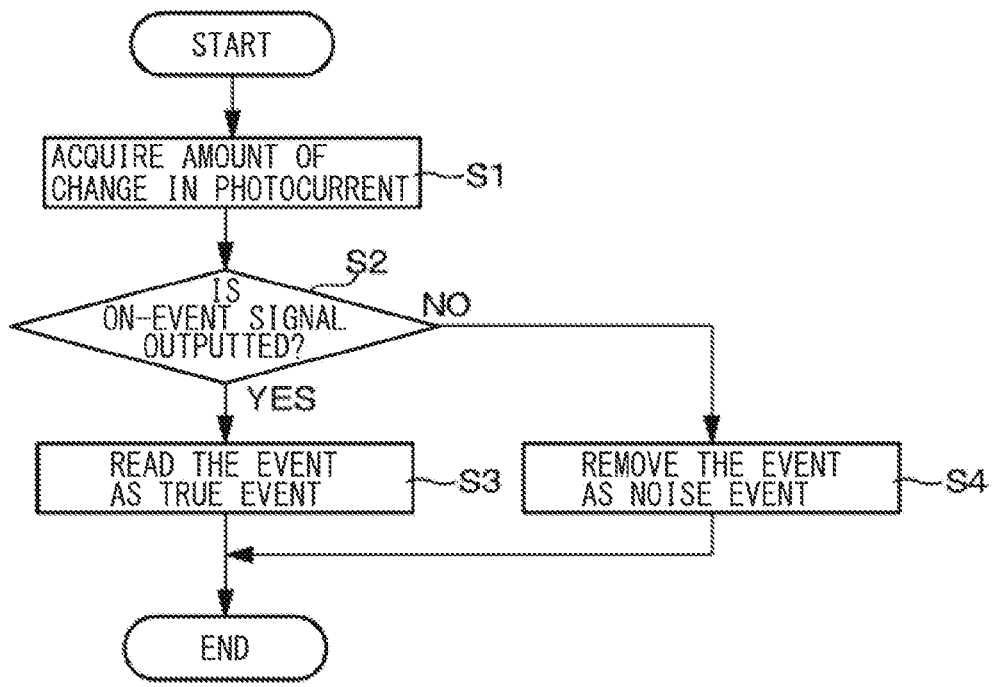
[FIG. 14B]
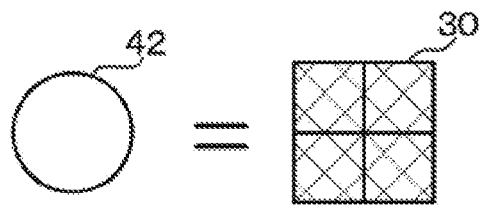
[FIG. 14C]
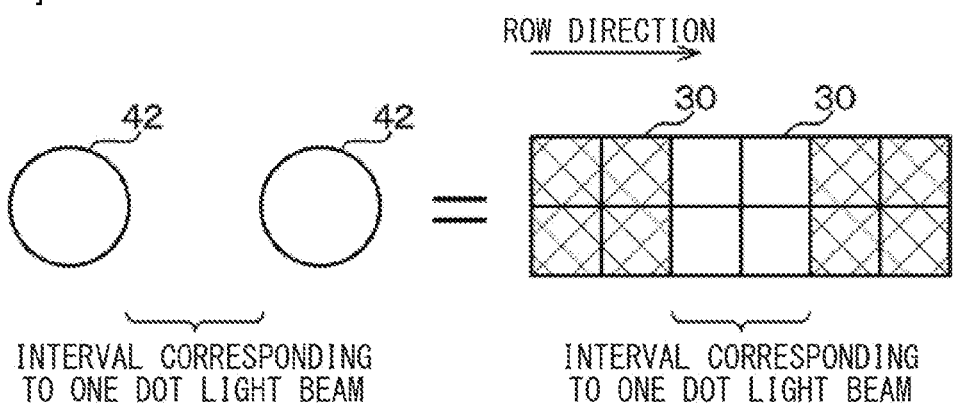

[FIG. 15A]
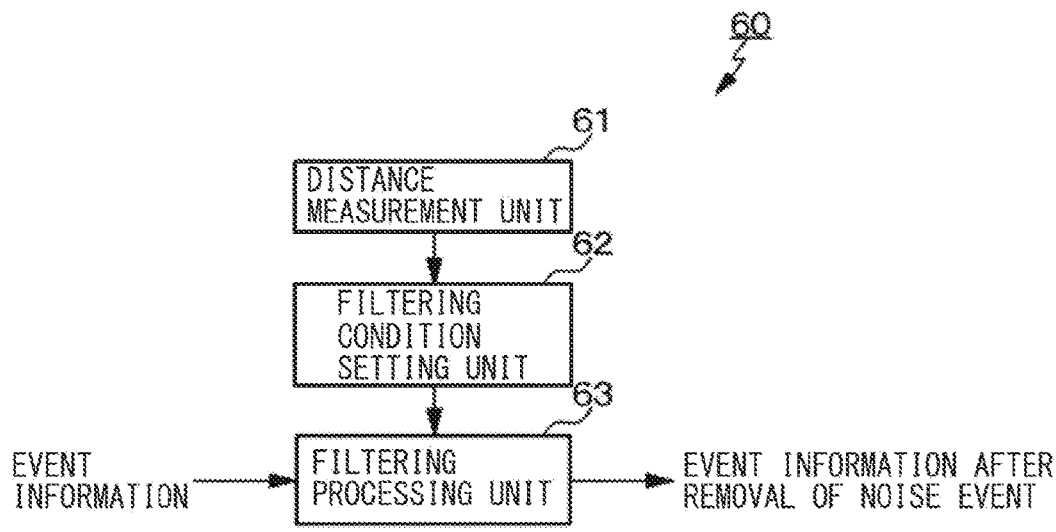
[FIG. 15B]
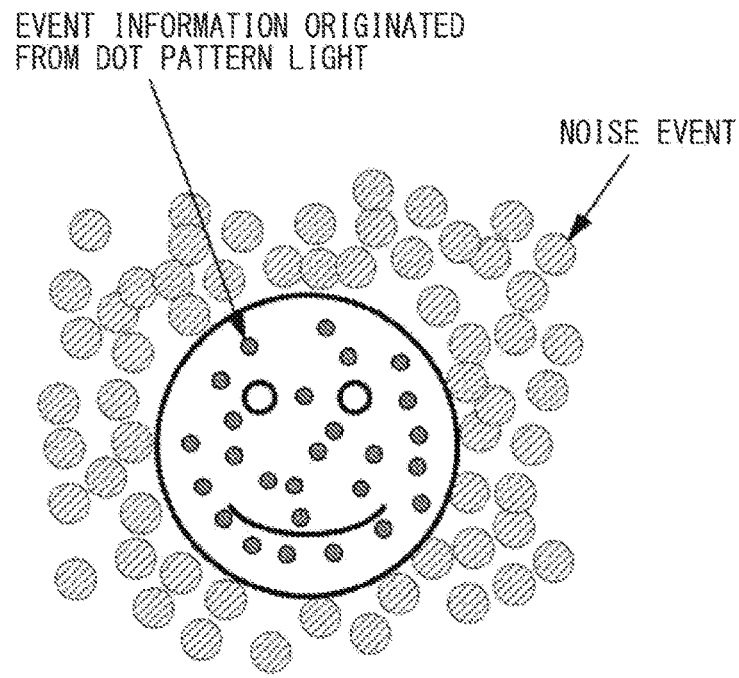

[FIG. 16]
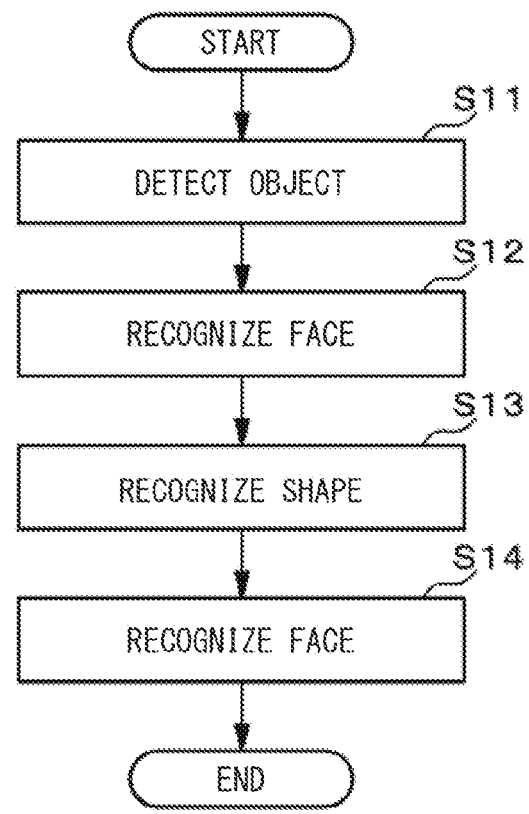

[FIG. 17]
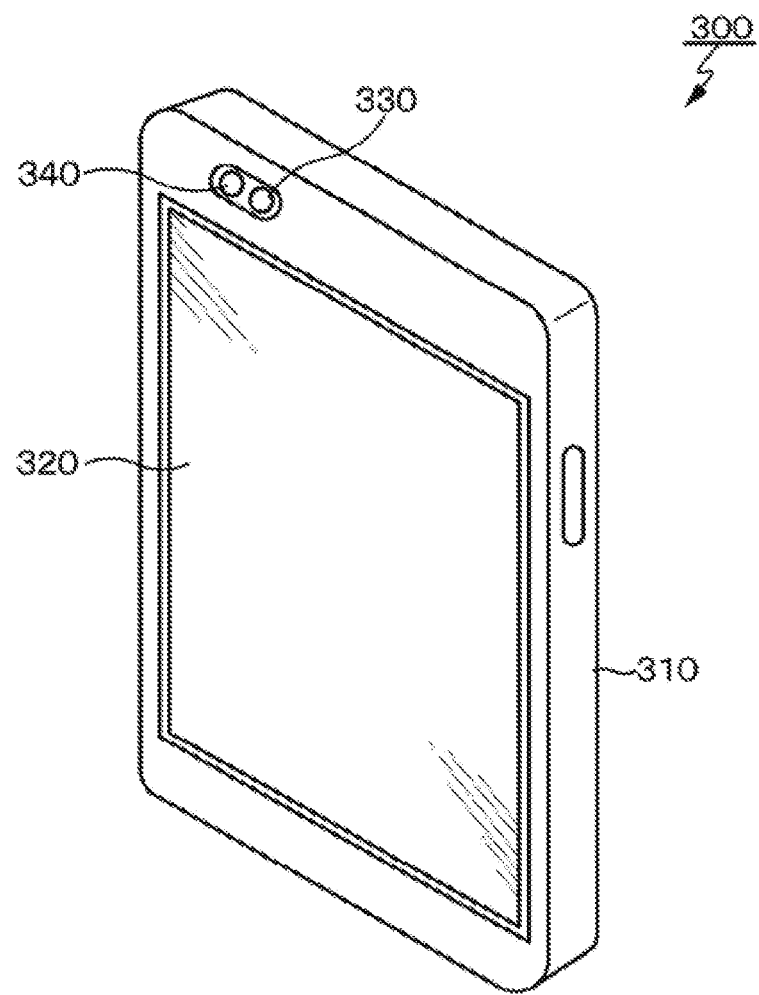

OBJECT RECOGNITION SYSTEM AND METHOD OF SIGNAL PROCESSING PERFORMED BY OBJECT RECOGNITION SYSTEM, AND ELECTRONIC APPARATUS

CROSS REFERENCE TO RELATED APPLICATIONS

This application is a U.S. National Phase of International Patent Application No. PCT/JP2020/029799 filed on Aug. 4, 2020, which claims priority benefit of Japanese Patent Application No. JP 2019-197052 filed in the Japan Patent Office on Oct. 30, 2019. Each of the above-referenced applications is hereby incorporated herein by reference in its entirety.

TECHNICAL FIELD

The disclosure relates to an object recognition system, a method of signal processing performed by the object recognition system, and an electronic apparatus.

BACKGROUND

As a system that acquires three-dimensional (3D) images (information on the depth of an object surface/depth information) and measures the distance to an object, a structured light method using a dynamic projector and a dynamic vision camera has been proposed (for example, refer to PTL 1). In the structured light method, the dynamic projector projects dot light having a predetermined pattern to a measurement target/an object, and distortion of the pattern is analyzed on the basis of the result of imaging performed by the dynamic vision camera to acquire the depth information/the distance information.

PTL 1 described above discloses a technique in which a vertical cavity surface emitting laser (VCSEL) is used as the dynamic projector serving as a light source, and an event detection sensor called a dynamic vision sensor (DVS) is used as the dynamic vision camera serving as a light receiving unit. The event detection sensor is a sensor that detects the fact that a change in luminance of a pixel photoelectrically converting incident light has exceeded a predetermined threshold as an event.

CITATION LIST

Patent Literature

[PTL 1] US 2019/0045173 A1

SUMMARY OF THE INVENTION

Problems to be Solved by the Invention

Incidentally, the event detection sensor outputs not only event information (a true event) originated from the dot light having the predetermined pattern emitted from the light source to the object as event information but also other information as a noise event. Thus, it is necessary to perform a process of removing the noise event other than the event information originated from the dot light having the predetermined pattern emitted from the light source to the object.

An object of the disclosure is to provide an object recognition system making it possible to remove the information (noise event) other than the event information originated from the dot light having the predetermined pattern emitted from the light source to the object and thereby reduces the loads on subsequent signal processing, a method of signal processing performed by the object recognition system, and an electronic apparatus including the object recognition system.

Means for Solving the Problem

To achieve the object described above, an object recognition system of the disclosure includes:
 a light source emitting dot light having a predetermined pattern to an object;
 an event detection sensor receiving the dot light having the predetermined pattern reflected from the object and detecting a fact that a change in luminance of a pixel has exceeded a predetermined threshold as an event; and
 a signal processor performing a process of removing information other than event information originated from the dot light emitted from the light source and having the predetermined pattern among event information detected by the event detection sensor.

Further, to achieve the object described above, a method of signal processing performed by an object recognition system of the disclosure including
 a light source emitting dot light having a predetermined pattern to an object, and
 an event detection sensor receiving the dot light reflected from the object and having the predetermined pattern, and detecting a fact that a change in luminance of a pixel has exceeded a predetermined threshold as an event, involves removing information other than event information originated from the dot light emitted from the light source and having the predetermined pattern among event information detected by the event detection sensor.

Further, to achieve the object described above, an electronic apparatus of the disclosure includes the object recognition system having the configuration described above.

BRIEF DESCRIPTION OF THE DRAWINGS

FIG. 1A is a schematic diagram illustrating an exemplary system configuration of an object recognition system to which the technology according to the disclosure is applied, and FIG. 1B is a block diagram illustrating an exemplary circuit configuration of the object recognition system.

FIG. 2A is a diagram illustrating an array dot arrangement of a vertical cavity surface emitting laser serving as a light source in the object recognition system of the disclosure, and FIG. 2B is a diagram illustrating a random dot arrangement in contradistinction to the array dot arrangement.

FIG. 3 is a block diagram illustrating an exemplary configuration of an event detection sensor according to a first configuration example in the object recognition system to which the technology according to the disclosure is applied.

FIG. 4 is a block diagram illustrating an exemplary configuration of a pixel array unit in the event detection sensor according to the first configuration example.

FIG. 5 is a circuit diagram illustrating an exemplary circuit configuration of a pixel in the event detection sensor according to the first configuration example.

FIG. 6 is a block diagram illustrating a first configuration example of an address event detection unit in the event detection sensor according to the first configuration example.

FIG. 7 is a circuit diagram illustrating an exemplary configuration of a current-voltage converting unit in the address event detection unit according to the first configuration example.

FIG. 8 is a circuit diagram illustrating an exemplary configuration of a subtracter and a quantizer in the address event detection unit according to the first configuration example.

FIG. 9 is a block diagram illustrating a second configuration example of the address event detection unit in the event detection sensor according to the first configuration example.

FIG. 10 is a block diagram illustrating an exemplary configuration of the event detection sensor according to a second configuration example in the object recognition system to which the technology according to the disclosure is applied.

FIG. 11 is a schematic exploded perspective view of a laminated chip structure of the event detection sensor in the object recognition system.

FIG. 12A is an image diagram illustrating event information originated from an animal body and including noise events, and FIG. 12B is an image diagram illustrating event information originated from dot pattern light emitted from the vertical cavity surface emitting laser to an object.

FIG. 13 is a block diagram illustrating an exemplary circuit configuration for achieving signal processing according to Example 1.

FIG. 14A is a flowchart illustrating an exemplary signal processing method performed by the object recognition system of the disclosure, FIG. 14B is a conceptual diagram of the signal processing according to Example 1, and FIG. 14C is a conceptual diagram illustrating signal processing according to Example 2.

FIG. 15A is a functional block diagram of a signal processor for achieving signal processing according to Example 3, and FIG. 15B is a conceptual diagram illustrating the difference in size of spotlight incident on the event detection sensor caused by the difference in distance to the object.

FIG. 16 is a flowchart illustrating exemplary signal processing according to Example 4.

FIG. 17 is an external view of a smartphone corresponding to an example of an electronic apparatus of the disclosure seen in a front direction.

MODE FOR CARRYING OUT THE INVENTION

In the following, some configurations for implementing the technology according to the disclosure (hereinafter referred to as "embodiments") are described in detail with reference to the drawings. The technology of the disclosure should not be limited to the embodiments. In the following description, the same components or components having the same function are denoted by the same reference numerals, and duplicated descriptions thereof are omitted. It is to be noted that the description is made in the following order.

1. Object Recognition System and Electronic Apparatus According to the Disclosure, and Overall Configuration
2. Object Recognition System to which the Technology of the Disclosure is Applied
  2-1. Exemplary System Configuration
  2-2. Vertical Cavity Surface Emitting Laser (VCSEL)
  2-3. Event Detection Sensor According to First Configuration Example (Arbiter Method)
    2-3-1. Configuration Example of Pixel Array Unit
    2-3-2. Exemplary Circuit Configuration of Pixel
    2-3-3. First Example of Address Event Detection Unit
    2-3-4. Exemplary Configuration of Current-Voltage Converting Unit
    2-3-5. Exemplary Configurations of Subtracter and Quantizer
    2-3-6. Second Configuration Example of Address Event Detection Unit
  2-4. Event Detection Sensor According to Second Configuration Example (Scanning Method)
  2-5. Exemplary Configuration of Chip Structure
  2-6. Exemplary Configuration of Column Processing Unit
  2-7. Noise Event
3. Object Recognition System According to the Disclosure
  3-1. Example 1 (An example in which one dot light beam is detected in units of four pixels adjacent to each other and a true event is read when the four pixels output an event signal within a certain period of time)
  3-2. Example 2 (An example in which the true event is read from a combination of a plurality of units in which one dot light beam is to be detected)
  3-3. Example 3 (An example in which the number of pixels in one unit in which one dot light beam is to be detected on the basis of the distance to an object)
  3-4. Example 4 (Exemplary face recognition processing in the case of the object recognition system applied to face recognition)
4. Modification Example
5. Application Example
6. Electronic Apparatus of the Disclosure (Smartphone)
7. Possible Configurations of the Disclosure <Object Recognition System and Electronic Apparatus According to the Disclosure, and Overall Configuration>

For an object recognition system and an electronic apparatus according to the disclosure, in a case where an event detection sensor is configured to detect one dot light beam in units of a plurality of pixels adjacent to each other, and when the plurality of pixels adjacent to each other reads an event within a certain period of time, the signal processor may read the event as event information originated from the dot light having a predetermined pattern.

For the object recognition system and the electronic apparatus according to the disclosure including the preferred configurations described above, the signal processor may read the event information originated from the dot light having the predetermined pattern from the combination of units each including the plurality of pixels in which the one dot light beam is to be detected. Additionally, the combination of the units each including the plurality of pixels may be a combination of a plurality of units adjacent to each other at an interval corresponding to the one dot light beam in a row direction, a column direction, or a diagonal direction of a pixel array matrix.

Further, for the object recognition system and the electronic apparatus according to the disclosure including the preferred configurations described above, the signal processor may change the number of the pixels in one unit in which the one dot light beam is to be detected on the basis of the distance to the object. Specifically, the signal processor may set a relatively small number of the pixels when the distance to the object is smaller than a predetermined threshold, and a relatively large number of the pixels when the distance to the object is larger than the predetermined threshold.

Further, for the object recognition system and the electronic apparatus according to the disclosure including the preferred configurations described above, the signal processor may have a distance measurement function of measuring the distance to the object, and measure the distance to the object using the distance measurement function. Alternatively, the distance to the object may be measured by a proximity sensor.

Further, for the object recognition system and the electronic apparatus according to the disclosure including the preferred configurations described above, the light source may preferably include a surface-emitting semiconductor laser, and the surface-emitting semiconductor laser may be preferably a vertical cavity surface.

Further, the object recognition system and the electronic apparatus according to the disclosure including the preferred configurations described above may be used for face recognition in a case where the object is a human face. Additionally, processing for the face recognition involves, in order, detecting a face at a certain position using a vertical cavity surface emitting laser serving as the light source and the event detection sensor, performing processing of recognizing features of the face detected, recognizing the shape of the face recognized, and performing processing of recognizing the face whose shape has been recognized.

<Object Recognition System to which the Technology of the Disclosure is Applied>

The object recognition system to which the technology according to the disclosure is applied includes a combination of a light source and an event detection sensor and uses a structured light method. The light source is a group of point light sources and configured to control emission/non-emission on a point light source basis. The event detection sensor detects. Additionally, the object recognition system to which the technology according to the disclosure is applied includes a function of acquiring three-dimensional (3D) images and a function of measuring the distance to the object. Using the structured light method, 3D images are acquired by identifying from which point light source a point image (spotlight) and the coordinates of the point image are projected through pattern matching.

Having the function of acquiring 3D images, the object recognition system to which the technology according to the disclosure is applied may be referred to as a three-dimensional image acquiring system. Having the function of measuring the distance to the object, the object recognition system to which the technology according to the disclosure is applied may be referred to as a ranging system. Further, in a case where the object is a human face, for example, the object recognition system to which the technology according to the disclosure is applied may be used for face recognition and thus be referred to as a face recognition system.

[Exemplary System Configuration]

FIG. 1A is a schematic diagram illustrating an exemplary system configuration of the object recognition system to which the technology according to the disclosure is applied. FIG. 1B is a block diagram illustrating an exemplary circuit configuration of the object recognition system.

An object recognition system 1 to which the technology according to the disclosure is applied includes a surface-emitting semiconductor laser such as a vertical cavity surface emitting laser (VCSEL) 10 as a light source that includes a group of point light sources and emits dot light beams having a predetermined pattern to the object. The object recognition system 1 further includes an event detection sensor 20 called a dynamic vision sensor (DVS) as a light receiving unit. It is to be noted that, as the light source emitting dot light having a predetermined pattern to the object, a general edge-emitting semiconductor laser (LD) may be exemplified in addition to the vertical cavity surface emitting laser (VCSEL).

The vertical cavity surface emitting laser 10 is configured to control emission/non-emission on a point light source basis. The vertical cavity surface emitting laser 10 projects dot light beams having, for example, a predetermined pattern to an object 200. The event detection sensor 20 has sensitivity with respect to infrared light (IR), receives a dot light beam reflected by the object 200, and detects the fact that a change in luminance of a pixel has exceeded a predetermined threshold as an event. The event detection sensor 20 is a sensor making it possible to achieve increase the speed and reduce the amount of data and electric consumption by reading a signal of the pixel exhibiting the change in luminance.

The object recognition system 1 to which the technology according to the disclosure is applied includes a system controller 100, a light source driver 40, a sensor controller 50, a signal processor 60, a light source-side optical system 70, and a camera-side optical system 80 as well as the vertical cavity surface emitting laser (VCSEL) 10 and the event detection sensor (DVS) 20. Details of the vertical cavity surface emitting laser 10 and the event detection sensor 20 will be described later.

The system controller 100 is configured by a processor (CPU), for example. The system controller 100 drives the vertical cavity surface emitting laser 10 via the light source driver 40, and drives the event detection sensor 20 via the sensor controller 50. To drive the vertical cavity surface emitting laser 10 and the event detection sensor 20, the system controller 100 preferably controls the vertical cavity surface emitting laser 10 and the event detection sensor 20 by synchronizing them.

[Vertical Cavity Surface Emitting Laser (VCSEL)]

The arrangement of the point light sources (dots) 11 in the vertical cavity surface emitting laser 10 is described. In the object recognition system 1 to which the technology according to the disclosure is applied, the point light sources 11 in the vertical cavity surface emitting laser 10 are arranged in two-dimensional arrays (matrix) provided at a constant pitch, as illustrated in FIG. 2A. The arrangement is a so-called array-dot arrangement.

For the object recognition system 1 including the combination of the vertical cavity surface emitting laser 10 and the event detection sensor 20, the point light sources 11 in the vertical cavity surface emitting laser 10 are sequentially turned on, and the event detection sensor 20 records time stamps of the events, i.e., time information indicating relative time of the occurrence of the events (timing information). Referring to the timing information, it is possible to easily identify from which point light source 11 the image is projected.

The number of the point light sources 11 provided in the array-dot arrangement is larger than that in a so-called random-dot arrangement illustrated in FIG. 2B, in which the point light sources 11 are arranged in a specific manner without repetition to have a feature in a spatial direction. The array-dot arrangement is thus advantageous in increasing the resolution of distance images that depends on the number of the point light sources 11. Herein, the term "distance image" refers to an image from which the information on the distance to the object is acquired.

Incidentally, in the case of the random-dot arrangement, it is difficult to increase the number of the point light sources 11 while the specific feature of the arrangement pattern of the point light sources 11 is maintained. This hinders an increase in the resolution of the distance image that depends on the number of the point light sources 11. However, the arrangement of the point light sources 11 in the vertical cavity surface emitting laser 10 in the object recognition system 1 to which the technology according to the disclosure is applied should not be limited to the array-dot arrangement and may be the random-dot arrangement.

The vertical cavity surface emitting laser 10 is a surface emitting light source configured to control emission/non-emission on a point light source 11 basis under the control of the system controller 100. Accordingly, the vertical cavity surface emitting laser 10 makes it possible to irradiate the entire object with light and irradiate part of the object with dot light with a desired pattern by dot irradiation on a point light source basis or line irradiation on a pixel column basis.

Incidentally, the structured light method may involve irradiating the object (distance measurement target) with light from the plurality of point light sources 11 at different angles, and reading the light reflected from the object to recognize the shape of the object.

Described next is the event detection sensor 20 that detects the fact that a change in luminance of a pixel has exceeded a predetermined threshold as an event.

[Event Detection Sensor According to First Configuration Example (Arbiter Method)]

FIG. 3 is a block diagram illustrating an exemplary configuration of the event detection sensor according to a first configuration example. The event detection sensor according to the first configuration example may be used as the event detection sensor 20 in the object recognition system 1.

As illustrated in FIG. 3, the event detection sensor 20 according to the first configuration example is an asynchronous event detection sensor called a DVS. The event detection sensor 20 includes a pixel array unit 21, a drive unit 23, an arbiter unit (arbitration unit) 24, a column processing unit 25, and a signal processing unit 26.

In the pixel array unit 21 of the event detection sensor 20 having the configuration described above, multiple pixels 30 are arranged in two-dimensional matrix (arrays). To the respective pixel arrays in the pixel array matrix, a vertical signal line VSL described below are connected.

Each of the multiple pixels 30 generates an analog signal having a voltage corresponding to a photocurrent as a pixel signal. Additionally, each of the multiple pixels 30 detects the presence or absence of an address event on the basis of the determination as to whether or not the amount of change in photocurrent has exceeded a predetermined threshold. When the address event is generated, the pixel 30 outputs a request to the arbiter unit 24.

The drive unit 23 outputs the pixel signal generated by each pixel 30 to the column processing unit 25 by driving the multiple pixels 30, respectively.

The arbiter unit 24 arbitrates the request from each of the multiple pixels 30 and send a response based on the result of arbitration to the pixel 30. When receiving the response from the arbiter unit 24, the pixel 30 supplies a detection signal indicating the detection result (a detection signal of the address event) to the drive unit 23 and the signal processing unit 26. The detection signals may be read from the pixels 30 in units of a plurality of columns.

The column processing unit 25 includes an analog-digital converter, for example. The column processing unit 25 performs processing of converting an analog signal outputted from each pixel column of the pixels 30 in the pixel array unit 21 into a digital signal. Thereafter, the column processing unit 25 supplies the digital signal to the signal processing unit 26 after the analog-digital conversion.

The signal processing unit 26 performs predetermined signal processing such as correlated double sampling (CDS) processing or image recognition processing on the digital signals supplied from the column processing unit 25. Thereafter, the signal processing unit 26 supplies data indicating the result of the processing and the detection signal supplied from the arbiter unit 24 to a recording unit 12 (refer to FIGS. 1A and 1B) via a signal line 14.

(Configuration Example of Pixel Array Unit)

FIG. 4 is a block diagram illustrating an exemplary configuration of the pixel array unit 21 in the event detection sensor 20 according to the first configuration example.

In the pixel array unit 21 including the multiple pixels 30 arranged in two-dimensional matrix, each of the multiple pixels 30 includes a light receiving unit 31, a pixel signal generating unit 32, and an address event detection unit 33.

The light receiving unit 31 in the pixel 30 having the configuration described above generates a photocurrent by photoelectrically converting incident light. Thereafter, the light receiving unit 31 supplies the photocurrent generated by the photoelectrical conversion to the pixel signal generating unit 32 or the address event detection unit 33 under the control of the drive unit 22 (refer to FIG. 3).

The pixel signal generating unit 32 generates a signal of voltage corresponding to the photocurrent supplied from the light receiving unit 31 as a pixel signal SIG, and supplies the generated pixel signal SIG to the column processing unit 24 (refer to FIG. 3) via the vertical signal line VSL.

The address event detection unit 33 detects the presence or absence of the address event on the basis of the determination as to whether or not the amount of change in photocurrent from the corresponding light receiving unit 31 has exceeded a predetermined threshold. The address event includes an on-event that the amount of change in photocurrent has exceeded an upper limit threshold and an off-event that the amount of change has fallen below a lower limit threshold, for example. Further, the detection signal of the address event includes one bit indicating the result of detection of the on-event, and one bit indicating the result of detection of the off-event, for example. It is to be noted that the address event detection unit 33 may be configured to detect only the on-event.

When the address event is generated, the address event detection unit 33 supplies the arbiter unit 23 (refer to FIG. 3) with a request for sending the detection signal of the address event. When receiving the response to the request from the arbiter unit 23, the address event detection unit 33 supplies the detection signal of the address event to the drive unit 22 and the signal processing unit 25.

(Exemplary Circuit Configuration of Pixel)

FIG. 5 is a circuit diagram illustrating an exemplary circuit configuration of the pixel 30 in the event detection sensor 20 according to the first configuration example. As described above, each of the multiple pixels 30 includes the light receiving unit 31, the pixel signal generating unit 32, and the address event detection unit 33.

The light receiving unit 31 in the pixel 30 having the configuration described above includes a light receiving element (photoelectric transducer) 311, a transfer transistor 312, and an overflow gate (OFG) transistor 313. As the transfer transistor 312 and the OFG transistor 313, an N-type metal oxide semiconductor (MOS) transistor is used, for example. The transfer transistor 312 and the OFG transistor 313 are coupled in series to each other.

The light receiving element 311 is coupled between a common connection node $N_1$ of the transfer transistor 312 and the OFG transistor 313 and a ground. The light receiving element 311 photoelectrically converts incident light to generate electric charge in the amount corresponding to the amount of incident light.

To a gate electrode of the transfer transistor 312, a transfer signal TRG is supplied from the drive unit 22 illustrated in FIG. 3. In response to the transfer signal TRG, the transfer transistor 312 supplies the electric charge generated by the photoelectrically conversion at the light receiving element 311 to the pixel signal generating unit 32.

To a gate electrode of the OFG transistor 313, a control signal OFG is supplied from the drive unit 22. In response to the control signal OFG, the OFG transistor 313 supplies the electric signal generated by the light receiving element 311 to the address event detection unit 33. The electric signal supplied to the address event detection unit 33 is a photocurrent including electric charge.

The pixel signal generating unit 32 includes a reset transistor 321, an amplification transistor 322, a selection transistor 323, and a floating diffusion layer 324. For example, an N-type MOS transistor is used as the reset transistor 321, the amplification transistor 322, and the selection transistor 323.

The light receiving unit 31 supplies the electric charge generated by the photoelectrical conversion at the light receiving element 311 to the pixel signal generating unit 32 via the transfer transistor 312. The electric charge supplied from the light receiving unit 31 accumulates in the floating diffusion layer 324. The floating diffusion layer 324 generates a voltage signal corresponding to the amount of electric charge accumulated. That is, the floating diffusion layer 324 converts electric charge into voltage.

The reset transistor 321 is coupled between a power line of a power voltage $V_{DD}$ and the floating diffusion layer 324. To a gate electrode of the reset transistor 321, a reset signal RST is supplied from the drive unit 22. In response to the reset signal RST, the reset transistor 321 initializes (resets) the amount of electric charge in the floating diffusion layer 325.

The amplification transistor 322 and the selection transistor 323 are coupled in series between the power line of the power voltage $V_{DD}$ and the vertical signal line VSL. The amplification transistor 322 amplifies the voltage signal generated by the electric charge voltage conversion at the floating diffusion layer 324.

To a gate electrode of the selection transistor 323, a selection signal SEL is supplied from the drive unit 22. In response to the selection signal SEL, the selection transistor 323 outputs the voltage signal amplified by the amplification transistor 322 to the column processing unit 24 (refer to FIG. 3) via the vertical signal line VSL as a pixel signal SIG.

In the event detection sensor 20 according to the first configuration example including the pixel array unit 21 having the two-dimensional arrays of the pixels 30 with the configuration described above, the drive unit 22 drives the OFG transistor 313 by supplying the control signal OFG to the OFG transistor 313 of the light receiving unit 31 when the controller 13 illustrated in FIGS. 1A and 1B instructs to start the detection of the address event, so that the OFG transistor 313 supplies a photocurrent to the address event detection unit 33.

When the address event is detected by any of the pixels 30, the drive unit 22 turns off the OFG transistor 313 of the pixel 30 so that the OFG transistor 313 stops supplying the photocurrent to the address event detection unit 33. Thereafter, the drive unit 22 drives the transfer transistor 312 by supplying the transfer signal TRG to the transfer transistor 312 so that the transfer transistor 312 transfers the electric charge photoelectrically converted at the light receiving element 311 to the floating diffusion layer 324.

As described above, the event detection sensor 20 according to the first configuration example including the pixel array unit 21 having the two-dimensional arrays of the pixels 30 with the configuration described above outputs only the pixel signal of the pixel 30 in which the address event has been detected to the column processing unit 24. Accordingly, the electric power consumption and the processing amount in the image processing at the event detection sensor 20 are reduced regardless of the presence or absence of the address event compared with the case where pixel signals of all of the pixels are outputted.

It is to be noted that the configuration of the pixel 30 described above is an example, and that the configuration of the pixel 30 should not be limited to the configuration example. For example, the pixel may have a configuration in which the pixel signal generating unit 32 is not provided. In the case of this pixel configuration, the OFG transistor 313 may be omitted in the light receiving unit 31, and the transfer transistor 312 may have the function of the OFG transistor 313.

(First Example of Address Event Detection Unit)

FIG. 6 is a block diagram illustrating a first configuration example of the address event detection unit 33 in the event detection sensor 20 according to the first configuration example. As illustrated in FIG. 6, the address event detection unit 33 according to the configuration example includes a current-voltage converting unit 331, a buffer 332, a subtracter 333, a quantizer 334, and a transfer unit 335.

The current-voltage converting unit 331 converts the photocurrent from the light receiving unit 33 of the pixel 30 into a voltage signal having a logarithm of the photocurrent. The current-voltage converting unit 331 supplies the voltage signal acquired as the result of the conversion to the buffer 332. The buffer 332 performs buffering of the voltage signal supplied from the current-voltage converting unit 331 and supplies the signal to the subtracter 333.

The drive unit 22 supplies a row drive signal to the subtracter 333. In accordance with the row drive signal, the subtracter 333 decreases the level of the voltage signal supplied from the buffer 332. Thereafter, the subtracter 333 supplies the voltage signal with a reduced level to the quantizer 334. The quantizer 334 quantizes the voltage signal supplied from the subtracter 333 into a digital signal, and outputs the digital signal to the transfer unit 335 as the detection signal of the address event.

The transfer unit 335 transfers the detection signal of the address event supplied from the quantizer 334 to the arbiter unit 23, for example. When the address event is detected, the transfer unit 335 supplies a request for sending the detection signal of the address event to the arbiter unit 23. Thereafter, when receiving a response to the request from the arbiter unit 23, the transfer unit 335 supplies the detection signal of the address event to the drive unit 22 and the signal processing unit 25.

Described next are configuration examples of the current-voltage converting unit 331, the subtracter 333, and the quantizer 334 in the address event detection unit 33.

(Exemplary Configuration of Current-Voltage Converting Unit)

FIG. 7 is a circuit diagram illustrating an exemplary configuration of the current-voltage converting unit 331 in the address event detection unit 33 according to the first configuration example. As illustrated in FIG. 7, the current-voltage converting unit 331 according to the example has a circuit configuration including an N-type transistor 3311, a P-type transistor 3312, and an N-type transistor 3313. As these transistors 3311 to 3313, MOS transistors are used, for example.

The N-type transistor 3311 is coupled between a power line of a power voltage $V_{DD}$ and a signal input line 3314. The P-type transistor 3312 and the N-type transistor 3313 are coupled in series between the power line of the power voltage $V_{DD}$ and the ground. Additionally, a gate electrode of the N-type transistor 3311 and an input terminal of the buffer 332 illustrated in FIG. 6 are coupled to a common connection node $N_2$ of the P-type transistor 3312 and the N-type transistor 3313.

A predetermined bias voltage $V_{bias}$ is applied to a gate electrode of the P-type transistor 3312. The P-type transistor 3312 thereby supplies a constant current to the N-type transistor 3313. Photocurrent is inputted from the light receiving unit 31 to a gate electrode of the N-type transistor 3313 via the signal input line 3314.

Drain electrodes of the N-type transistor 3311 and the N-type transistor 3313 are coupled to a power source side. These circuits are called source followers. The two source followers connected into a loop shape convert the photocurrent from the light receiving unit 31 into a voltage signal having a logarithm of the photocurrent.

(Exemplary Configurations of Subtracter and Quantizer)

FIG. 8 is a circuit diagram illustrating exemplary configurations of the subtracter 333 and the quantizer 334 in the address event detection unit 33 according to the first configuration example.

The subtracter 333 according to the example has a configuration including a capacitative element 3331, an inverter circuit 3332, a capacitative element 3333, and a switch element 3334.

One terminal of the capacitative element 3331 is coupled to an output terminal of the buffer 332 illustrated in FIG. 6, and the other end of the capacitative element 3331 is coupled to an input terminal of the inverter circuit 3332. The capacitative element 3333 is coupled in parallel to the inverter circuit 3332. The switch element 3334 is coupled between both ends of the capacitative element 3333. The drive unit 22 supplies the row drive signal to the switch element 3334 as an opening/closing control signal. In accordance with the row drive signal, the switch element 3334 opens or closes a path coupling both ends of the capacitative element 3333. The inverter circuit 3332 reverses the polarity of the voltage signal inputted via the capacitative element 3331.

When the switch element 3334 is turned on (in a closed state) in the subtracter 333 having the configuration described above, a voltage signal $V_{init}$ is inputted to a terminal of the capacitative element 3331 adjacent to the buffer 332, and the other terminal of the capacitative element 3331 becomes a virtual ground terminal. The virtual ground terminal has a potential of zero for convenience of explanation. At this time, a charge $Q_{init}$ accumulated in the capacitative element 3331 is represented by the following expression (1):

$$Q_{init} = C_1 \times V_{init} \quad (1)$$

where $C_1$ denotes the capacitance of the capacitative element 3331. In contrast, a charge accumulated in the capacitative element 3333 is zero as both ends of the capacitative element 3333 are shunted.

Next, when the switch element 3334 is turned off (in an open state) and the voltage at the terminal of the capacitative element 3331 adjacent to the buffer 332 changes to $V_{after}$, a charge $Q_{after}$ accumulated in the capacitative element 3331 is represented by the following expression (2):

$$Q_{after} = C_1 \times V_{after} \quad (2)$$

In contrast, a charge $Q_2$ accumulated in the capacitative element 3333 is represented by the following expression (3):

$$Q_2 = -C_2 \times V_{out} \quad (3)$$

where $C_2$ denotes the capacitance of the capacitative element 3333, and $V_{out}$ denotes an output voltage.

At this time, as the total amount of charges of the capacitative element 3331 and the capacitative element 3333 do not change, the following expression (4) is satisfied:

$$Q_{init} = Q_{after} + Q_2 \quad (4)$$

Substituting the expressions (1) to (3) to the expression (4) and deforming the resultant expression yields the following expression (5):

$$V_{out} = -(C_1/C_2) \times (V_{after} - V_{init}) \quad (5)$$

The expression (5) represents a subtraction operation of the voltage signal, and the gain of the result of subtraction is represented by $C_1/C_2$. As the gain is generally required to be maximized, it is preferable to design such that $C_1$ becomes large and $C_2$ becomes small. However, if $C_2$ is too small, a kTC noise can increase and the noise characteristics can deteriorate. Thus, the reduction in capacitance of $C_2$ is limited within such a range that the noise is generated in an acceptable amount. Additionally, as the address event detection unit 33 including the subtracter 333 in each pixel 30 is mounted, the capacitative element 3331 and the capacitative element 3333 have constraints on area. In view of them, the capacitance $C_1$ of the capacitative element 3331 and and the capacitance $C_2$ of the capacitative element 3333 are determined.

In FIG. 8, the quantizer 334 includes a comparator 3341. The comparator 3341 receives an output signal from the inverter circuit 3332, i.e., a voltage signal from the subtracter 430 as an non-inverting (+) input, and receives a predetermined threshold voltage $V_{th}$ as an inverting (−) input. Thereafter, the comparator 3341 compares the voltage signal from the subtracter 430 with the predetermined threshold voltage $V_{th}$, and outputs a signal indicating the result of comparison to the transfer unit 335 as the detection signal of the address event.

(Second Configuration Example of Address Event Detection Unit)

FIG. 9 is a block diagram illustrating a second configuration example of the address event detection unit 33 in the event detection sensor 20 according to the first configuration example. As illustrated in FIG. 9, the address event detection unit 33 according to the second configuration example includes a storage 336 and a control unit 337 in addition to the current-voltage converting unit 331, the buffer 332, the subtracter 333, the quantizer 334, and the transfer unit 335.

The storage 336 is provided between the quantizer 334 and the transfer unit 335. The storage 336 stores an output of the quantizer 334, i.e., the results of comparison at the comparator 3341 on the basis of a sample signal supplied from the control unit 337. The storage 336 may be a sampling circuit made of a switch, plastic, or a capacitor, or a digital memory circuit made of a latch or a flip-flop.

The control unit 337 supplies the predetermined threshold voltage $V_{th}$ to the inverting (−) input terminal of the comparator 3341. The threshold voltage $V_{th}$ supplied from the control unit 337 to the comparator 3341 may be varied by time sharing. For example, the control unit 337 supplies a threshold voltage $V_{th1}$ indicating a threshold voltage corresponding to the on-event that the amount of change in photocurrent has exceeded the upper limit threshold and a threshold voltage $V_{th2}$ indicating a threshold voltage corresponding to the off-event that the amount of change in photocurrent has fallen below the lower limit threshold at different timings. This allows the single comparator 3341 to detect several various kinds of address events.

For example, while the threshold voltage $V_{th2}$ corresponding to the off-event is supplied from the control unit 337 to the inverting (−) input terminal of the comparator 3341, the storage 336 may store the results of comparison at the comparator 3341 using the threshold voltage $V_{th1}$ corresponding to the on-event. It is to be noted that the storage 336 may be provided inside the pixel 30 or outside the pixel 30. Further, the storage 336 is not an essential component of the address event detection unit 33. That is, the storage 336 may be omitted.

[Event Detection Sensor According to Second Configuration Example (Scanning Method)]

The event detection sensor 20 according to the first configuration example described above is an asynchronous event detection sensor that reads the events by an asynchronous reading method. It is to be noted that the event reading method should not be limited to the asynchronous reading method. The event reading method may be a synchronous reading method. An event detection sensor to which a synchronous reading method is applied is an event detection sensor using a scanning method, as with the case of a general imaging apparatus that performs imaging at a predetermined frame rate.

FIG. 10 is a block diagram illustrating an exemplary configuration of an event detection sensor according to a second configuration example. The event detection sensor according to the second configuration example may be used as the event detection sensor 20 in the object recognition system 1 to which the technology according to the disclosure is applied, i.e., the event detection sensor using the scanning method.

As illustrated in FIG. 10, the event detection sensor 20 according to the second configuration example includes the pixel array unit 21, the drive unit 22, the signal processing unit 25, a reading region selecting unit 27, and a signal generating unit 28.

The pixel array unit 21 includes the multiple pixels 30. The multiple pixels 30 output output signals in response to selection signals from the reading region selecting unit 27. Each of the multiple pixels 30 may include the comparator, as illustrated in FIG. 8, for example. The multiple pixels 30 output output signals corresponding to the amount of change in light intensity. The multiple pixels 30 may be arranged in two-dimensional matrix, as illustrated in FIG. 10.

The drive unit 22 drives each of the multiple pixels 30 to output a pixel signal generated at each of the pixels 30 to the signal processing unit 25. It is to be noted that the drive unit 22 and the signal processing unit 25 are circuit units that acquire gray scale information. Thus, in a case where only the event information is to be acquired, the drive unit 22 and the signal processing unit 25 may be omitted.

The reading region selecting unit 27 selects some of the multiple pixels 30 included in the pixel array unit 21. For example, the reading region selecting unit 27 determines a selected region in accordance with a request from each of the pixels 30 of the pixel array unit 21. For example, the reading region selecting unit 27 selects any one or more rows included in the two-dimensional matrix structure corresponding to the pixel array unit 21. The reading region selecting unit 27 sequentially selects one or more rows in a predetermined cycle.

On the basis of output signals from the pixels selected by the reading region selecting unit 27, the signal generating unit 28 generates an event signal corresponding to an active pixel having detected the event among the selected pixels. The event is an event of the change in light intensity. The active pixel is a pixel whose amount of change in light intensity in response to the output signal has exceeded a predetermined threshold or has fallen below the predetermined threshold. For example, the signal generating unit 28 compares the output signals of the pixels with a reference signal to detect the active pixel that outputs an output signal larger than or smaller than the reference signal. The signal generating unit 28 then generates the event signal corresponding to the active pixel.

The signal generating unit 28 may include, for example, a row selection circuit that arbitrates a signal inputted to the signal generating unit 28. Further, the signal generating unit 28 is configured not only to output the information on the active pixel having detected the event but also to output the information on a non-active pixel having detected no event.

From the signal generating unit 28, address information of the active pixel having detected the event and time stamp information (e.g., X, Y, and T) are outputted through an output line 15. It is to be noted that the data outputted from the signal generating unit 28 may include not only the address information and the time stamp information but also frame format information (e.g., (0,0,1,0, . . . )).

[Exemplary Configuration of Chip Structure]

The chip (semiconductor integrated circuit) structure of event detection sensor 20 according to the first configuration example or the second configuration example described above may be a laminated chip structure, for example. FIG. 11 is an exploded perspective view of the event detection sensor 20 having the laminated chip structure.

As illustrated in FIG. 11, the laminated chip structure, i.e., a so-called laminated structure includes a laminate of at least two chips: a light receiving chip 201 serving as a first chip and a detection chip 202 serving as a second chip. Each of the light receiving elements 311 in the circuit configuration of the pixel 30 illustrated in FIG. 5 are provided on the light receiving chip 201, and all elements other than the light receiving elements 311 and elements in the other circuit portions of the pixel 30 are provided on the detection chip 202. The light receiving chip 201 and the detection chip 202 are electrically coupled via a connection portion such as a via, Cu—Cu bonding, or a bump.

It is to be noted that, although the light receiving elements 311 are provided on the light receiving chip 201 and the elements other than the light receiving elements 311 and the elements in the other circuit portions of the pixel 30 are provided on the detection chip 202 in the configuration example described herein, the configuration example is not restrictive.

For example, in the circuit configuration of the pixel 30 illustrated in FIG. 5, the elements of the light receiving unit 31 may be provided on the light receiving chip 201, and the elements other than the light receiving unit 31 and the elements in the other circuit portions of the pixel 30 may be provided on the detection chip 202. Further, the elements of the light receiving unit 31 and the reset transistor 321 and the floating diffusion layer 324 of the pixel signal generating unit 32 may be provided on the light receiving chip 201, and elements other than these elements may be provided on the detection chip 202. Further, some of the elements included in the address event detection unit 33 may be provided on the light receiving chip 201 together with the elements of the light receiving unit 31.

[Noise Event]

Incidentally, the event information outputted from the event detection sensor 20 in the object recognition system 1 using the structured light method should not be limited to the event information (true event) originated from the dot light having a predetermined pattern (hereinafter also referred to as "dot pattern light" emitted from the vertical cavity surface emitting laser 10 to the object. For example, the event information originated from the movement of the object (an animal body) includes other information (hereinafter also referred to as "noise event") when outputted. The noise event (false event) may be, for example, information originated from a change in pattern projected on the object, background light, or a sensor noise, for example.

FIG. 12A is an image diagram illustrating the event information originated from an animal body and including noise events. FIG. 12B is an image diagram illustrating the event information (true event) originated from the dot pattern light emitted from the vertical cavity surface emitting laser 10 to the object. If the event information outputted from the event detection sensor 20 includes the true events and the noise events, it is necessary to perform processing of removing the noises in a subsequent stage. This can place loads on the subsequent signal processing.

<Object Recognition System According to the Disclosure>

The object recognition system 1 according to the embodiment of the disclosure makes it possible to reduce the loads on the subsequent signal processing by removing the information other than the event information originated from the dot pattern light (dot light having a predetermined pattern) emitted from the surface-emitting semiconductor laser serving as a light source, e.g., the vertical cavity surface emitting laser 10 to the object, i.e., the noise events (false events).

Described below is a specific example of the embodiment for outputting (reading) the event information (true event) originated from the dot pattern light emitted from the vertical cavity surface emitting laser 10 to the object and including no noise event (false event).

Example 1

It is supposed that the noise event is generated independently in each pixel, for example. However, an animal body has a certain size. Thus, the event information originated from the dot pattern light emitted from the vertical cavity surface emitting laser 10 to the object is generated across the pixels in a certain region.

Accordingly, in a case where the distance from the event detection sensor 20 to the object (i.e., the distance between the object and the event detection sensor 20) is a predetermined distance, one dot light beam is detected in units of four pixels adjacent to each other in Example 1. The four pixels includes two pixels in the row direction by two pixels in the column direction.

However, the number of adjacent pixels in one unit in which one dot light beam is to be detected should not be limited four. In a case where the object recognition system 1 according to the present embodiment is used as a face recognition system mounted on a smartphone, for example, the term "predetermined distance" used herein refers to an average distance between the smartphone and the face of a human holding the smartphone in the hand, for example.

Further, in the signal processing according to Example 1, the event information (true event) originated from the dot pattern light emitted from the vertical cavity surface emitting laser 10 to the object is read when the four pixels adjacent to each other output an on-event signal indicating that the amount of change in photocurrent from each of the light receiving units 31 (refer to FIG. 4) has exceeded the upper limit threshold within a certain period of time. Accordingly, in a case where the four pixels adjacent to each other do not output the on-event signal within the certain period of time, the event information is not read as it is determined to be the noise event.

It is to be noted that, although the true event originated from the dot pattern light is read when the four pixels output the on-event signal within the certain period of time, an off-event signal indicating that the amount of change in photocurrent from each of the light receiving units 31 has fallen below the lower limit threshold may be outputted in place of the on-event signal.

The signal processing according to Example 1 is executed as one of the signal processes performed by the signal processor 60 illustrated in FIG. 1B. Accordingly, when the four pixels adjacent to each other do not output the on-event signal within the certain period of time, the signal processor 60 has a filtering function of removing the noise events. An exemplary circuit configuration for implementing the signal processing according to Example 1 is illustrated in FIG. 13.

In the signal processing according to Example 1, an operation circuit 41 is provided in units of four pixels 30 adjacent to each other (i.e., two pixels in the row direction by two pixels in the column direction). When the four pixels 30 adjacent to each other output the on-event signal (or the off-event signal) within the certain period of time, the operation circuit 41 reads the event as the event information (true event) originated from the dot pattern light emitted to the object.

It is to be noted that, although the determination as to whether the event information is true or false is performed by hardware using the operation circuit 41 in the present embodiment, this is a mere example. The determination may be performed by a method other than the signal processing using the operation circuit 41. For example, the on-event signals (or the off-event signals) outputted from the pixels 30 of the event detection sensor 20 may be stored in a memory, and the determination as to whether the event information is true or false may be performed by software in a certain time cycle.

FIG. 14A illustrates a flowchart of exemplary signal processing performed by the object recognition system according to the disclosure in which the determination is performed by software. First, the signal processor 60 acquires the amount of change in photocurrent from each of the light receiving units 31 (refer to FIG. 4) in units of four pixels adjacent to each other (Step S1), and determines whether the four pixels adjacent to each other output the on-event signal indicating that the amount of change in photocurrent has exceeded the upper limit threshold within the certain period of time (Step S2). If it is determined that the on-event signal is outputted (S2: YES), the event is read as the event information (true event) originated from the dot pattern light emitted to the object (Step S3). Otherwise (S2: NO), the event is removed as the noise event (Step S4).

Example 2

Example 2 is a modification example of Example 1. In the signal processing of Example 1, one dot light beam 42 is detected in units of four pixels 30 adjacent to each other as illustrated in FIG. 14B, and the event information (true event) is read in this unit.

In contrast, in the signal processing of Example 2, a plurality of units in which one dot light beam 42 is to be detected are combined to detect the event information (true event). Specifically, in the signal processing of Example 2, two units adjacent to each other at an interval corresponding to one dot light beam in the row direction are combined into one unit in which the event information is to be detected, as illustrated in FIG. 14C, for example. In the case of the combination of units, the event information (true event) is read when an event is detected in four pixels in a first unit, no event is detected in four pixels in the interval, and an event is detected in four pixels in a second unit.

In a case where the object recognition system 1 according to the present embodiment is used as a face recognition system, for example, the shift amount of the dot light having a reflection dot pattern based on the dot pattern light emitted to the object is predictable to a certain degree as a human face has a slight unevenness. Thus, according to the signal processing of Example 2, it is possible to remove an event detected at a location shifted by, for example, one pixel from the unit that includes four pixels 30 in which one dot light beam is to be detected as a noise event.

It is to be noted that, although the combination of units each including four pixels 30 includes two units adjacent to each other at the interval corresponding to one dot light beam in the row direction, the combination may include two units adjacent to each other at the interval corresponding to one dot light beam in the column direction or two units adjacent to each other at the interval corresponding to one dot light beam in both directions. Further, the combination should not be limited to the combination of two units. As with the case of the signal processing of Example 1, the signal processing of Example 2 is performed by the signal processor 60 illustrated in FIG. 1B.

Example 3

In Example 3, the number of pixels included in one unit in which one dot light beam 42 is to be detected is changed on the basis of the distance to the object (i.e., the distance between the object and the event detection sensor 20).

Since the object recognition system 1 according to the present example embodiment uses the structured light method, the signal processor 60 illustrated in FIG. 1B has a function of measuring the distance to the object. Using the distance measurement function, it is possible to measure the distance between the object and the event detection sensor 20.

It is to be noted that the measurement of the distance between the object and the event detection sensor 20 should not be limited to using the distance measurement function of the signal processor 60. Alternatively, a proximity sensor such as a time of flight (ToF) sensor may be used, for example.

FIG. 15A is a functional block diagram of the signal processor 60 for implementing signal processing according to Example 3. FIG. 15B is a conceptual diagram illustrating the difference in size (dimension) of spotlight incident on the event detection sensor 20 due to the difference in distance to the object.

The dot pattern light emitted from the vertical cavity surface emitting laser 10 to the object is reflected by the object, and spotlight is incident on the event detection sensor 20. The size (dimensions) of the spotlight becomes relatively small as the object is located closer, and becomes relatively large as the object is located farther.

When the object recognition system 1 according to the present embodiment is used as a face recognition system mounted on a smartphone, for example, the size of a light spot reflected by the human face located close to the smartphone is relatively small, and the size of a light spot reflected by the background behind the face is relatively large, as illustrated in FIG. 15B. In this case, a threshold for removing the noise event is set between the sizes of the two light spots. Accordingly, the light spot reflected by the human face and having a small size is detected as the event information (true event) originated from the dot pattern light, and other light spots are removed as the noise events.

However, the distance to the object, i.e., the distance between the object and the event detection sensor 20 is not always constant. For example, the distance differs depending on the user of the smartphone. Thus, in the signal processing according to Example 3, the number of pixels included in one unit in which one dot light beam 42 is to be detected is changed on the basis of the distance to the object. The number of pixels in one unit in which one dot light beam 42 is to be detected may be regarded as a filtering condition for filtering processing performed by the signal processor 60. That is, in the signal processing according to Example 3, the information on the distance to the object is acquired, and the filtering condition is changed on the basis of the result of acquisition.

As illustrated in FIG. 15A, a functional unit of the signal processor 60 for implementing the signal processing according to Example 3 includes a distance measurement unit 61, a filtering condition setting unit 62, and a filtering processing unit 63.

The distance measurement unit 61 includes the distance measurement function of the object recognition system 1 or a proximity sensor such as a ToF sensor, and measures the distance to the object, i.e., the distance between the object and the event detection sensor 20.

On the basis of the results of measurement by the distance measurement unit 61, the filtering condition setting unit 62 sets the filtering condition, i.e., the number of pixels included in one unit in which one dot light beam 42 is to be detected. For example, in a case where the distance to the human face is smaller than a predetermined threshold, the number of pixels is set to a relatively small value; for example, four pixels in total, including two pixels adjacent to each other in the row direction by two pixels adjacent to each other in the column direction, are set as the filtering condition. In contrast, in a case where the distance to the human face is larger than the predetermined threshold, the number of pixels is set to a relatively large value; for example, nine pixels in total, including three pixels adjacent to each other in the row direction by three pixels adjacent to each other in the column direction, are set as the filtering condition.

The filtering processing unit 63 performs filtering processing on the basis of the filtering condition set by the filtering condition setting unit 62. In the filtering processing, the event information originated from the dot pattern light is read as the true event, and the other event information is removed as the noise event.

In the signal processing according to Example 3 described above, the number of pixels included in one unit in which one dot light beam 42 is to be detected, i.e., the filtering condition is changed on the basis of the distance to the object (i.e., the distance between the object and the event detection sensor 20). Accordingly, even when the distance to the object changes, it is possible to certainly read the event information originated from the dot pattern light as the true event and remove the other event information as the noise event.

The distance to the object is measured using the distance measurement function of the object recognition system 1 or the proximity sensor such as a ToF sensor in the present embodiment; however, it is to be noted that, when the object recognition system 1 is mounted on a smartphone, for example, an approximate distance to a human face may be determined on the basis of an average size of a human face without directly measuring the distance.

Accordingly, the shape of the face may be detected on the basis of an output of the event detection sensor 20, and the filtering condition may be set on the basis of the outline size. Specifically, the distance to the face is determined to be relatively short when the outline size of the face is greater than a predetermined threshold, and four pixels adjacent to each other are set as the filtering condition, for example. In contrast, the distance to the face is determined to be relatively long when the outline size of the face is less than or equal to the predetermined threshold, and nine pixels adjacent to each other are set as the filtering condition, for example.

Further, more detailed adaptive control may be achieved by setting different filtering conditions for different regions of the object in the signal processing according to Example 3. For example, in a case where the object recognition system 1 is applied to face recognition, the shape of a face is detected on the basis of an output of the event detection sensor 20, and thereafter, different filtering conditions are set to a nose portion located relatively close to the event detection sensor 20 and a cheek portion located relatively far from the event detection sensor 20. This achieves more detailed adaptive control.

Example 4

Example 4 is exemplary processing for face recognition in a case where the object recognition system 1 is applied to face recognition, for example.

FIG. 16 is a flowchart illustrating exemplary processing for signal processing according to Example 4, i.e., face recognition. In a case where the function of the system controller 100 illustrated in FIG. 1B is implemented by a processor, the processing is performed by the signal processor 60 under the control of the processor of the system controller 100.

The processor of the system controller 100 (hereinafter simply referred to as "processor") uses the vertical cavity surface emitting laser 10 and the event detection sensor 20 to detect an object at a certain position, e.g., a human face in this example (Step S11).

Since the human face is present in a limited region within an imaging range in this object detection processing, only the point light sources 11 within a certain region of the pixel arrays in the vertical cavity surface emitting laser 10 are operated. In response to this, only the pixels 30 including the light receiving elements 311 within a certain region of the pixel array in the event detection sensor 20 are operated.

As described above, the vertical cavity surface emitting laser 10 and the event detection sensor 20 are partly operated to perform the distance measurement at low power consumption upon the object detection. It is to be noted that the operation of the event detection sensor 20 at low power consumption is achieved by on/off control of the power source in each pixel 30.

The object detection using the vertical cavity surface emitting laser 10 and the event detection sensor 20 is achieved by, for example, a known triangulation system that measures the distance to the object using a triangulation method.

Next, the processor performs recognition processing of recognizing the features of the face acquired by the object detection (Step S12). In this face recognition processing, the vertical cavity surface emitting laser 10 operates the point light sources 11 in a wide-angle region rather than a partial region. In contrast, the event detection sensor 20 operates the pixels 30 including the light receiving elements 311 in a certain region of interest (ROI). Additionally, in the face recognition processing, the event detection sensor 20 performs a gray scale reading operation using the pixel signal generating unit 32 illustrated in FIG. 5. It is possible to acquire a high-resolution image by the gray-scale reading operation.

As described above, in the face recognition processing in Step S12, a high-resolution image of the face obtained by the object detection is acquired by the wide-angle irradiation by the vertical cavity surface emitting laser 10 and the gray-scale reading operation by the event detection sensor 20. Thereafter, the feature points of the face are extracted for the face recognition on the basis of the high-resolution image.

The face recognition uses a pattern recognition technique involving machine learning such as a neural network. For example, a technique involving comparing the feature points of a face provided as teacher's data with the feature points of a captured face image is used to perform the recognition processing.

Next, the processor performs shape recognition on the basis of the face recognized (Step S13). In this shape recognition processing, the shape of the face is recognized by a ranging system using a structured light method. Specifically, the vertical cavity surface emitting laser 10 configured to control emission/non-emission of each pixel emits pattern light on a time-series basis to the face recognized by dot emission or line emission.

In contrast, the event detection sensor 20 uses the event data outputted from the address event detection unit 33 illustrated in FIG. 6 or FIG. 9. The event data includes the time stamp that is time information indicating relative time when the event occurs. The location where the event has occurred is identified on the basis of the time stamp or the time information.

As described above, in the shape recognition processing in Step S13, the shape of the face is recognized by chronological high-definition matching in a spatial direction using the vertical cavity surface emitting laser 10 configured to control emission/non-emission of each pixel and the event detection sensor 20 that reads the location where the event has occurred.

Lastly, the processor recognizes the face acquired by the shape recognition using a known face recognition technique (Step S14). For example, the known face recognition technique involves extracting multiple feature points of the face image, and checking the feature points against feature points preliminarily registered to perform the face recognition.

The signal processing according to Example 4 described above is a process for the face recognition performed by the object recognition system 1 including a combination of the vertical cavity surface emitting laser 10 and the event detection sensor 20 and using the structured light method. The object recognition system 1 makes it possible to remove the noise events and read only the event information originated from the dot pattern light emitted to the face. Thus, according to the signal processing of Example 4, it is possible to perform the face recognition processing more certainly.

Modification Example

Although the technology according to the disclosure is described above referring to some preferred embodiments, the technology according to the disclosure should not be limited to these embodiments. The configuration and structure of the object recognition system described in the foregoing embodiments are examples and may be changed as appropriate.

Application Example

The object recognition system according to the disclosure described above may be used as a face recognition system mounted in various electronic apparatuses having a face recognition function. Examples of the electronic apparatuses having the face recognition function may include mobile devices such as smartphones, tablets, and personal computers.

It is to be noted that the apparatus (system) including the object recognition system of the disclosure as the face recognition system should not be limited to these mobile devices, and may be other devices than the mobile devices. For example, the apparatus may be a security system or an automobile that unlocks a door by face recognition.

<Electronic Apparatus of the Disclosure>

Here, a smartphone is described as an example of the electronic apparatus of the disclosure to which the object recognition system of the disclosure is applicable. FIG. 17 is an external view, seen in the front direction, of a smartphone in which the object recognition system according to any one of the embodiments described above is mounted as the face recognition system.

A smartphone 300 according to the present example includes a casing 310 and a display unit 320 on the front side of the casing 310. The smartphone 300 in which the object recognition system according to any one of the embodiments described above is mounted as the face recognition system includes a light emitting unit 330 and a light receiving unit 340 at a front upper portion of the casing 310. An exemplary arrangement of the light emitting unit 330 and the light receiving unit 340 illustrated in FIG. 17 is an example and not restrictive.

The smartphone 300, which is an example mobile device having the configuration described above, includes the vertical cavity surface emitting laser (VCSEL) 10 described above as the light emitting unit 330, and the event detection sensor (DVS) 30 in the object recognition system 1 as the light receiving unit 340. That is, the smartphone 300 according to the present example includes the object recognition system 1 according to any of the embodiments described above, and is produced as a smartphone having the face recognition function.

<Possible Configurations of the Disclosure>

It is to be noted that the disclosure may have the following configurations.

«A. Object Recognition System»

[A-1] An object recognition system including:
  a light source emitting dot light having a predetermined pattern to an object;
  an event detection sensor receiving the dot light having the predetermined pattern reflected from the object and detecting a fact that a change in luminance of a pixel has exceeded a predetermined threshold as an event; and
  a signal processor performing a process of removing information other than event information originated from the dot light emitted from the light source and having the predetermined pattern among event information detected by the event detection sensor.

[A-2] The object recognition system according to [A-1] described above, in which,
  in a case where the event detection sensor is configured to detect one dot light beam in units of a plurality of pixels adjacent to each other, and where the plurality of pixels adjacent to each other detects the event within a certain period of time, the signal processor reads the event as the event information originated from the dot light having the predetermined pattern.

[A-3] The object recognition system according to [A-2] described above, in which the signal processor reads the event information originated from the dot light having the predetermined pattern from a combination of a plurality of the units each including the plurality of pixels in which the one dot light beam is to be detected.

[A-4] The object recognition system according to [A-3] described above, in which the combination of the plurality of the units each including the plurality of pixels is a combination of a plurality of units adjacent to each other at an interval corresponding to the one dot light beam in a row direction, a column direction, or a diagonal direction of a pixel array matrix.

[A-5] The object recognition system according to [A-2] described above, in which the signal processor changes the number of the pixels in one unit in which the one dot light beam is to be detected on the basis of the distance to the object.

[A-6] The object recognition system according to [A-5] described above, in which the signal processor sets a relatively small number of the pixels when the distance to the object is smaller than a predetermined threshold, and a relatively large number of the pixels when the distance to the object is larger than or equal to the predetermined threshold.

[A-7] The object recognition system according to [A-5] described above or [A-6] described above, in which the signal processor has a distance measurement function of measuring the distance to the object, and measures the distance to the object using the distance measurement function.

[A-8] The object recognition system according to [A-5] described above or [A-6] described above, in which the distance to the object is measured by a proximity sensor.

[A-9] The object recognition system according to any one of [A-1] described above to [A-8] described above, in which the light source includes a surface-emitting semiconductor laser.

[A-10] The object recognition system according to [A-9] described above, in which the surface-emitting semiconductor laser is a vertical cavity surface emitting laser.

[A-11] The object recognition system according to any one of [A-1] described above to [A-10] described above, used for face recognition in a case where the object is a human face.

[A-12] The object recognition system according to [A-11] described above, in which processing for the face recognition involves, in order,
  detecting a face at a certain position using the vertical cavity surface emitting laser serving as the light source and the event detection sensor, performing processing of recognizing features of the face detected, recognizing a shape of the face recognized, and performing processing of recognizing the face whose shape has been recognized.

«B. Electronic Apparatus»

[B-1] An electronic apparatus including an object recognition system including:
- a light source emitting dot light having a predetermined pattern to an object;
- an event detection sensor receiving the dot light having the predetermined pattern reflected from the object and detecting a fact that a change in luminance of a pixel has exceeded a predetermined threshold as an event; and
- a signal processor performing a process of removing information other than event information originated from the dot light emitted from the light source and having the predetermined pattern among event information detected by the event detection sensor.

[B-2] The electronic apparatus according to [B-1] described above, in which,
in a case where the event detection sensor is configured to detect one dot light beam in units of a plurality of pixels adjacent to each other, and where the plurality of pixels adjacent to each other detects the event within a certain period of time, the signal processor reads the event as the event information originated from the dot light having the predetermined pattern.

[B-3] The electronic apparatus according to [B-2] described above, in which the signal processor reads the event information originated from the dot light having the predetermined pattern from a combination of a plurality of the units each including the plurality of pixels in which the one dot light beam is to be detected.

[B-4] The electronic apparatus according to [B-3] described above, in which the combination of the plurality of the units each including the plurality of pixels is a combination of a plurality of units adjacent to each other at an interval corresponding to the one dot light beam in a row direction, a column direction, or a diagonal direction of a pixel array matrix.

[B-5] The electronic apparatus according to [B-2] described above, in which the signal processor changes the number of the pixels in one unit in which the one dot light beam is to be detected on the basis of the distance to the object.

[B-6] The electronic apparatus according to [B-5] described above, in which the signal processor sets a relatively small number of the pixels when the distance to the object is smaller than a predetermined threshold, and a relatively large number of the pixels when the distance to the object is larger than or equal to the predetermined threshold.

[B-7] The electronic apparatus according to [B-5] described above or [B-6] described above, in which the signal processor has a distance measurement function of measuring the distance to the object, and measures the distance to the object using the distance measurement function.

[B-8] The electronic apparatus according to [B-5] described above or [B-6] described above, in which the distance to the object is measured by a proximity sensor.

[B-9] The electronic apparatus according to any one of [B-1] described above to [B-8] described above, in which the light source includes a surface-emitting semiconductor laser.

[B-10] The electronic apparatus according to [B-9] described above, in which the surface-emitting semiconductor laser is a vertical cavity surface emitting laser.

[B-11] The electronic apparatus according to any one of [B-1] described above to [B-10] described above, used for face recognition in a case where the object is a human face.

[B-12] The electronic apparatus according to [B-11] described above, in which processing for the face recognition involves, in order,
detecting a face at a certain position using the vertical cavity surface emitting laser serving as the light source and the event detection sensor, performing processing of recognizing features of the face detected, recognizing a shape of the face recognized, and performing processing of recognizing the face whose shape has been recognized.

REFERENCE SIGNS LIST

1 . . . object recognition system, 10 . . . vertical cavity surface emitting laser (VCSEL), 11 . . . point light source, 20 . . . event detection sensor (DVS), 21 . . . pixel array unit, 22 . . . drive unit, 23 . . . arbiter unit (arbitration unit), 24 . . . column processing unit, 25 . . . signal processing unit, 30 . . . pixel, 40 . . . light source driver, 50 . . . sensor controller, 60 . . . signal processor, 61 . . . distance measurement unit, 62 . . . filtering condition setting unit, 63 . . . filtering processing unit

The invention claimed is:

1. An object recognition system, comprising:
a light source configured to emit dot light onto an object, wherein the dot light has a pattern;
an event detection sensor including:
a first unit that includes a first plurality of pixels; and
a second unit that includes a second plurality of pixels, wherein
the first unit is adjacent to the second unit,
the object reflects the dot light onto the event detection sensor, and
the event detection sensor is configured to:
detect a dot light beam of the reflected dot light in at least one of the first plurality of pixels or the second plurality of pixels, wherein the reflected dot light has the pattern;
detect, that a change in luminance of each pixel of the at least one of the first plurality of pixels or the second plurality of pixels has exceeded a first threshold, as an event, wherein the detection of the event is within a specific time; and
output, based on the event, first event information that includes second event information and noise information, wherein the second event information has the pattern; and
a signal processor configured to:
determine a distance between the event detection sensor and the object;
change, based on the determined distance, a number of the at least one of the first plurality of pixels or the second plurality of pixels, in which the dot light beam is detected;
determine whether the output of the first event information is one of within the specific time or outside of the specific time;
read the second event information from the first event information in a case where the output of the first event information is within the specific time, wherein the second event information is read in the at least one of the first plurality of pixels or the second plurality of pixels; and remove the noise information from the first event information in a case where the output of the first event information is outside of the specific time.

2. The object recognition system according to claim 1, wherein the signal processor is further configured to read the second event information in a combination of the first unit and the second unit.

3. The object recognition system according to claim 2, wherein
the first plurality of pixels and the second plurality of pixels are in a pixel array matrix,
the first unit and the second unit are at an interval,
the interval corresponds to the dot light beam, and
the first unit and the second unit are in at least one of a row direction of the pixel array matrix, a column direction of the pixel array matrix, or a diagonal direction of the pixel array matrix.

4. The object recognition system according to claim 1, wherein
the signal processor is further configured to:
set, to a first number, the number of the at least one of the first plurality of pixels or the second plurality of pixels, in a case where the determined distance is smaller than a second threshold; and
set, to a second number, the number of the at least one of the first plurality of pixels or the second plurality of pixels, in a case where the determined distance is one of larger than the second threshold or equal to the second threshold, wherein the first number is smaller than the second number.

5. The object recognition system according to claim 1, wherein the signal processor has a distance measurement function configured to measure the distance.

6. The object recognition system according to claim 1, wherein the signal processor further includes a proximity sensor configured to measure the distance.

7. The object recognition system according to claim 1, wherein the light source includes a surface-emitting semiconductor laser.

8. The object recognition system according to claim 7, wherein the surface-emitting semiconductor laser comprises a vertical cavity surface emitting laser.

9. The object recognition system according to claim 1, wherein
the object is a human face, and
the signal processor is further configured to execute a process of face recognition.

10. The object recognition system according to claim 9, wherein
the light source is a vertical cavity surface emitting laser, and
the process of face recognition includes, in order:
detection of a face at a position based on the vertical cavity surface emitting laser and the event detection sensor;
recognition of one or more features of the face;
recognition of a shape of the face based on the one or more features; and
recognition of the face that has the recognized shape.

11. A method of signal processing, the method comprising:
in an object recognition system that includes a light source, an event detection sensor, and a signal processor:
emitting, by the light source, dot light onto an object, wherein
the dot light has a pattern,
the object reflects the dot light onto the event detection sensor,
the event detection sensor includes:
a first unit that includes a first plurality of pixels, and
a second unit that includes a second plurality of pixels, and the first unit is adjacent to the second unit;
determining, by the signal processor, a distance between the event detection sensor and the object;
changing, by the signal processor, a number of at least one of the first plurality of pixels or the second plurality of pixels, wherein the change of the number is based on the determined distance;
detecting, by the event detection sensor, a dot light beam of the reflected dot light in the at least one of the first plurality of pixels or the second plurality of pixels, wherein the reflected dot light has the pattern;
detecting, as an event by the event detection sensor, that a change in luminance of each pixel of the at least one of the first plurality of pixels or the second plurality of pixels has exceeded a threshold, wherein the detection of the event is within a specific time;
outputting, by the event detection sensor, first event information that includes second event information and noise information, wherein
the second event information has the pattern, and
the output of the first event information is based on the event;
determining, by the signal processor, whether the output of the first event information is one of within the specific time or outside of the specific time;
reading, by the signal processor, the second event information from the first event information in a case where the output of the first event information is within the specific time, wherein the second event information is read in the at least one of the first plurality of pixels or the second plurality of pixels; and
removing, by the signal processor, the noise information from the first event information in a case where the output of the first event information is outside of the specific time.

12. An electronic apparatus, comprising:
an object recognition system including:
a light source configured to emit dot light onto an object, wherein the dot light has a pattern;
an event detection sensor including:
a first unit that includes a first plurality of pixels; and
a second unit that includes a second plurality of pixels, wherein
the first unit is adjacent to the second unit,
the object reflects the dot light onto the event detection sensor, and
the event detection sensor is configured to:
detect a dot light beam of the reflected dot light in at least one of the first plurality of pixels or the second plurality of pixels, wherein the reflected dot light has the pattern;
detect, that a change in luminance of each pixel of the at least one of the first plurality of pixels or the second plurality of pixels has exceeded a threshold, as an event, wherein the detection of the event is within a specific time; and
output, based on the event, first event information that includes second event information and noise information, wherein the second event information has the pattern; and a signal processor configured to:
   determine a distance between the event detection sensor and the object;
   change, based on the determined distance, a number of the at least one of the first plurality of pixels or the second plurality of pixels, in which the dot light beam is detected;
   determine whether the output of the first event information is one of within the specific time or outside of the specific time;
   read the second event information from the first event information in a case where the output of the first event information is within the specific time, wherein the second event information is read in the at least one of the first plurality of pixels or the second plurality of pixels; and
   remove the noise information from the first event information in a case where the output of the first event information is outside of the specific time.

13. An object recognition system, comprising:
a light source configured to emit dot light onto an object, wherein the dot light has a pattern;
an event detection sensor including:
   a first unit that includes a first plurality of pixels; and
   a second unit that includes a second plurality of pixels, wherein
      the first unit is adjacent to the second unit,
      the object reflects the dot light onto one or more pixels of at least one of the first plurality of pixels or the second plurality of pixels, and
      the event detection sensor is configured to:
         receive the reflected dot light having the pattern;
         detect a dot light beam of the dot light in at least one of the first unit or the second unit;
         detect, that a change in luminance of the one or more pixels of at least one of the first plurality of pixels or the second plurality of pixels has exceeded a threshold, as an event;
         detect the event in the at least one of the first unit or the second unit within a time; and
         output, based on the event, first event information that includes second event information and noise information, wherein the second event information has the pattern; and
a signal processor configured to:
   detect a distance between the event detection sensor and the object;
   change, based on the detected distance, a number of the at least one of the first plurality of pixels in the first unit or the second plurality of pixels in the second unit, in which the dot light beam is detected;
   read the event as the second event information in the at least one of the first unit or the second unit; and
   remove the noise information from the first event information.

* * * * *